United States Patent
Jätzold et al.

(10) Patent No.: US 11,921,694 B2
(45) Date of Patent: Mar. 5, 2024

(54) TECHNIQUES FOR COLLAPSING VIEWS OF CONTENT ITEMS IN A GRAPHICAL USER INTERFACE

(71) Applicant: Dropbox, Inc., San Francisco, CA (US)

(72) Inventors: Stephan Jätzold, San Francisco, CA (US); Daniel Wagner, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 21 days.

(21) Appl. No.: 17/812,652

(22) Filed: Jul. 14, 2022

(65) Prior Publication Data

US 2022/0374408 A1    Nov. 24, 2022

Related U.S. Application Data

(63) Continuation of application No. 17/210,375, filed on Mar. 23, 2021, now Pat. No. 11,392,575, which is a continuation of application No. 16/051,136, filed on Jul. 31, 2018, now Pat. No. 10,963,446, which is a continuation of application No. 14/490,601, filed on Sep. 18, 2014, now Pat. No. 10,089,346, which is a
(Continued)

(51) Int. Cl.
| | |
|---|---|
| *G06F 3/048* | (2013.01) |
| *G06F 3/0484* | (2022.01) |
| *G06F 3/04883* | (2022.01) |
| *G06F 16/23* | (2019.01) |
| *G06F 16/583* | (2019.01) |

(52) U.S. Cl.
CPC ........ *G06F 16/2322* (2019.01); *G06F 3/0484* (2013.01); *G06F 3/04883* (2013.01); *G06F 16/583* (2019.01); *G06F 2203/04806* (2013.01)

(58) Field of Classification Search
None
See application file for complete search history.

(56) References Cited

U.S. PATENT DOCUMENTS

| | | | |
|---|---|---|---|
| 7,492,935 | B2 | 2/2009 | Glukhovsky et al. |
| 7,554,530 | B2 | 6/2009 | Mizobuchi et al. |

(Continued)

OTHER PUBLICATIONS

Final Office Action from U.S. Appl. No. 15/812,909, dated Apr. 30, 2020, 11 pages.

(Continued)

*Primary Examiner* — William C Trapanese
(74) *Attorney, Agent, or Firm* — Keller Preece PLLC

(57) ABSTRACT

The present disclosure is directed toward systems and methods that provide users with efficient and effective user experiences when browsing, selecting, or inspecting content items. More specifically, systems and methods described herein provide users the ability to easily and effectively select multiple content items via a single touch gesture (e.g., swipe gesture). Additionally, systems and methods disclosed herein can allow users to select various content items in a selection interface, preview a content item, and return to the selection interface with the previous selections remaining intact. Still further, systems and methods described herein allow users to transition between a content graphical user interface and a selection interface based on touch gestures with content items. Embodiments of the present invention further provide improved navigability by collapsing views of content items.

20 Claims, 19 Drawing Sheets

Related U.S. Application Data continuation-in-part of application No. 14/262,520, filed on Apr. 25, 2014, now Pat. No. 9,891,794.

(56) References Cited

U.S. PATENT DOCUMENTS

| | | | |
|---|---|---|---|
| 7,629,966 B2 | 12/2009 | Anson et al. | |
| 7,689,933 B1 | 3/2010 | Parsons | |
| 7,788,592 B2 | 8/2010 | Williams et al. | |
| 8,028,251 B2 | 9/2011 | Park et al. | |
| 8,284,170 B2 | 10/2012 | Bernstein et al. | |
| 8,543,934 B1 | 9/2013 | Thorsander et al. | |
| 8,634,875 B1 | 1/2014 | Narayanachar | |
| 8,644,620 B1 | 2/2014 | Lam et al. | |
| 8,724,910 B1 | 5/2014 | Pillai et al. | |
| 8,854,433 B1 | 10/2014 | Rafii et al. | |
| 8,892,997 B2 | 11/2014 | Louch et al. | |
| 9,513,770 B1 | 12/2016 | Sun et al. | |
| 2003/0128226 A1 | 7/2003 | Handy Bosma et al. | |
| 2003/0210282 A1 | 11/2003 | Bosma et al. | |
| 2004/0193594 A1 | 9/2004 | Moore et al. | |
| 2004/0210575 A1 | 10/2004 | Bean et al. | |
| 2005/0210020 A1 | 9/2005 | Gunn et al. | |
| 2005/0210402 A1 | 9/2005 | Gunn et al. | |
| 2006/0224993 A1 | 10/2006 | Wong et al. | |
| 2007/0035551 A1 | 2/2007 | Ubillos | |
| 2007/0186178 A1 | 8/2007 | Schiller et al. | |
| 2007/0226255 A1 | 9/2007 | Anderson et al. | |
| 2008/0094371 A1 | 4/2008 | Forstall et al. | |
| 2008/0232690 A1 | 9/2008 | Saund et al. | |
| 2008/0235211 A1 | 9/2008 | Saund et al. | |
| 2008/0301586 A1* | 12/2008 | Ayatsuka | G06F 16/54 |
| | | | 715/840 |
| 2008/0309644 A1 | 12/2008 | Arimoto et al. | |
| 2009/0077497 A1 | 3/2009 | Cho et al. | |
| 2010/0088647 A1 | 4/2010 | Jing et al. | |
| 2010/0235786 A1 | 9/2010 | Maizels et al. | |
| 2010/0269033 A1 | 10/2010 | Siegel et al. | |
| 2011/0035705 A1 | 2/2011 | Faenger et al. | |
| 2011/0043437 A1 | 2/2011 | Tang et al. | |
| 2011/0078597 A1 | 3/2011 | Rapp et al. | |
| 2011/0126156 A1* | 5/2011 | Krishnaraj | G06F 3/04845 |
| | | | 345/629 |
| 2011/0252357 A1 | 10/2011 | Chaudhri et al. | |
| 2011/0307455 A1 | 12/2011 | Gupta et al. | |
| 2012/0030566 A1 | 2/2012 | Victor et al. | |
| 2012/0051605 A1 | 3/2012 | Nagar et al. | |
| 2012/0154444 A1 | 6/2012 | Fernandez et al. | |
| 2012/0213404 A1 | 8/2012 | Steiner | |
| 2013/0033525 A1 | 2/2013 | Markiewicz et al. | |
| 2013/0044053 A1 | 2/2013 | Galor et al. | |
| 2013/0125002 A1* | 5/2013 | Spaeth | G06F 3/04842 |
| | | | 715/731 |
| 2013/0167055 A1 | 6/2013 | Penev et al. | |
| 2013/0179836 A1 | 7/2013 | Han et al. | |
| 2013/0211843 A1 | 8/2013 | Clarkson et al. | |
| 2013/0218835 A1 | 8/2013 | Greenspan et al. | |
| 2013/0227490 A1 | 8/2013 | Thorsander et al. | |
| 2014/0075354 A1 | 3/2014 | Ko et al. | |
| 2014/0081926 A1 | 3/2014 | Adams et al. | |
| 2014/0096092 A1 | 4/2014 | Johnson et al. | |
| 2014/0109012 A1 | 4/2014 | Choudhary et al. | |
| 2014/0169644 A1 | 6/2014 | Dockhorn et al. | |
| 2014/0169702 A1 | 6/2014 | Dockhorn et al. | |
| 2014/0169703 A1 | 6/2014 | Martin et al. | |
| 2014/0173483 A1 | 6/2014 | Hicks et al. | |
| 2014/0223345 A1 | 8/2014 | Tetali et al. | |
| 2014/0282254 A1 | 9/2014 | Feiereisen et al. | |
| 2014/0283014 A1 | 9/2014 | Tse et al. | |
| 2014/0321762 A1 | 10/2014 | Pozas et al. | |
| 2014/0359505 A1 | 12/2014 | Cisler et al. | |
| 2014/0380247 A1 | 12/2014 | Tecarro et al. | |
| 2015/0121242 A1 | 4/2015 | Kwon et al. | |
| 2015/0127643 A1 | 5/2015 | Cohen et al. | |
| 2015/0169635 A1* | 6/2015 | Jing | G06F 16/285 |
| | | | 707/723 |
| 2015/0309698 A1 | 10/2015 | Senderek et al. | |
| 2015/0309701 A1 | 10/2015 | Jätzold et al. | |
| 2018/0074683 A1 | 3/2018 | Senderek et al. | |
| 2018/0336234 A1 | 11/2018 | Jatzold et al. | |

OTHER PUBLICATIONS

Final Office Action from U.S. Appl. No. 16/051,136, dated Jun. 25, 2020, 10 pages.
Final Office Action from U.S. Appl. No. 17/080,122, dated Feb. 7, 2022, 12 pages.
Kim S.J., "Brush-and-drag: A Multitouch Interface for Photo Triaging," 2012, MobileHCI'12—Proceedings of the 14th International Conference on Human Computer Interactions with Mobile Devices and Services, Sep. 21-24, 2012, pp. 59-68.
Non-Final Office Action from U.S. Appl. No. 17/080,122, dated Jul. 9, 2021, 10 pages.
Non-Final Office Action from U.S. Appl. No. 15/812,909, dated Oct. 4, 2019, 10 pages.
Non-Final Office Action from U.S. Appl. No. 16/051,136, dated Dec. 12, 2019, 10 pages.
Non-Final Office Action from U.S. Appl. No. 16/051,136, dated Oct. 6, 2020, 11 pages.
Non-Final Office Action from U.S. Appl. No. 17/210,375, dated Nov. 23, 2021, 12 pages.
Notice of Allowance from U.S. Appl. No. 17/080,122, dated Jul. 1, 2022, 5 pages.
Notice of Allowance from U.S. Appl. No. 15/812,909, dated Aug. 7, 2020, 5 pages.
Notice of Allowance from U.S. Appl. No. 16/051,136, dated Jan. 11, 2021, 5 pages.
Notice of Allowance from U.S. Appl. No. 17/210,375, dated Apr. 4, 2022, 5 pages.
Notice of Allowance for U.S. Appl. No. 14/262,520 dated Aug. 14, 2017, 6 pages.
Notice of Allowance for U.S. Appl. No. 14/490,601 dated Apr. 18, 2018, 7 pages.
Office Action for U.S. Appl. No. 14/262,520 dated Feb. 16, 2016, 16 pages.
Office Action for U.S. Appl. No. 14/262,520 dated Jan. 13, 2017, 19 pages.
Office Action for U.S. Appl. No. 14/262,520 dated Sep. 8, 2016, 19 pages.
Office Action for U.S. Appl. No. 14/490,601 dated Aug. 30, 2017, 14 pages.
Office Action for U.S. Appl. No. 14/490,601 dated Mar. 10, 2017, 10 pages.
Non-Final Office Action from U.S. Appl. No. 17/934,432, dated Mar. 16, 2023, 12 pages.
Final Office Action from U.S. Appl. No. 17/934,432, dated Sep. 14, 2023, 13 pages.

* cited by examiner

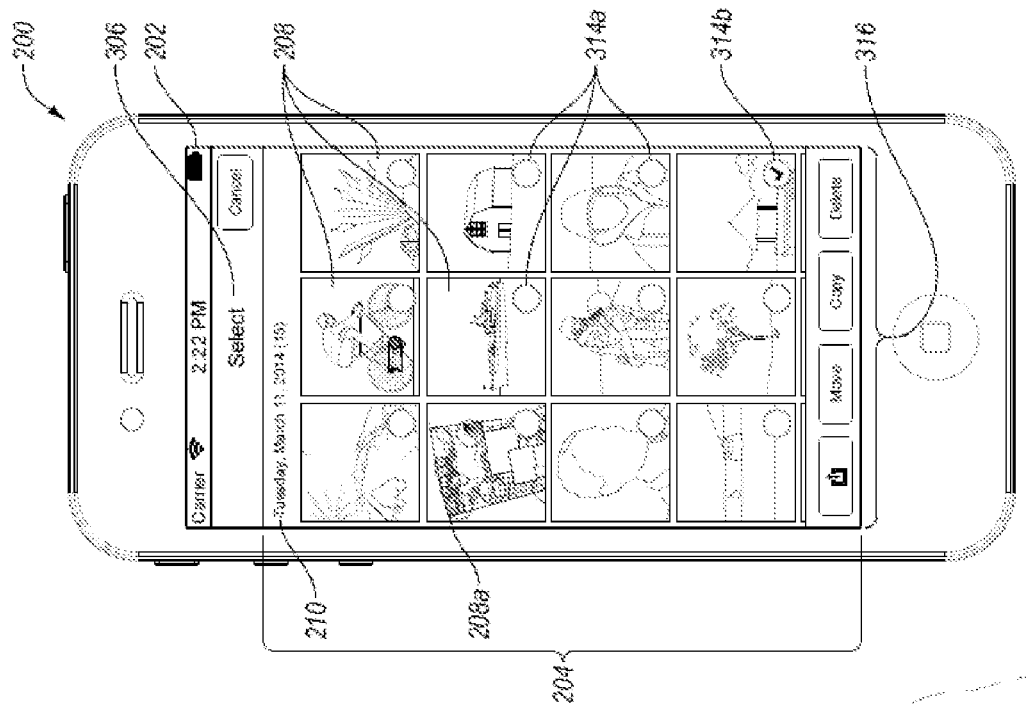
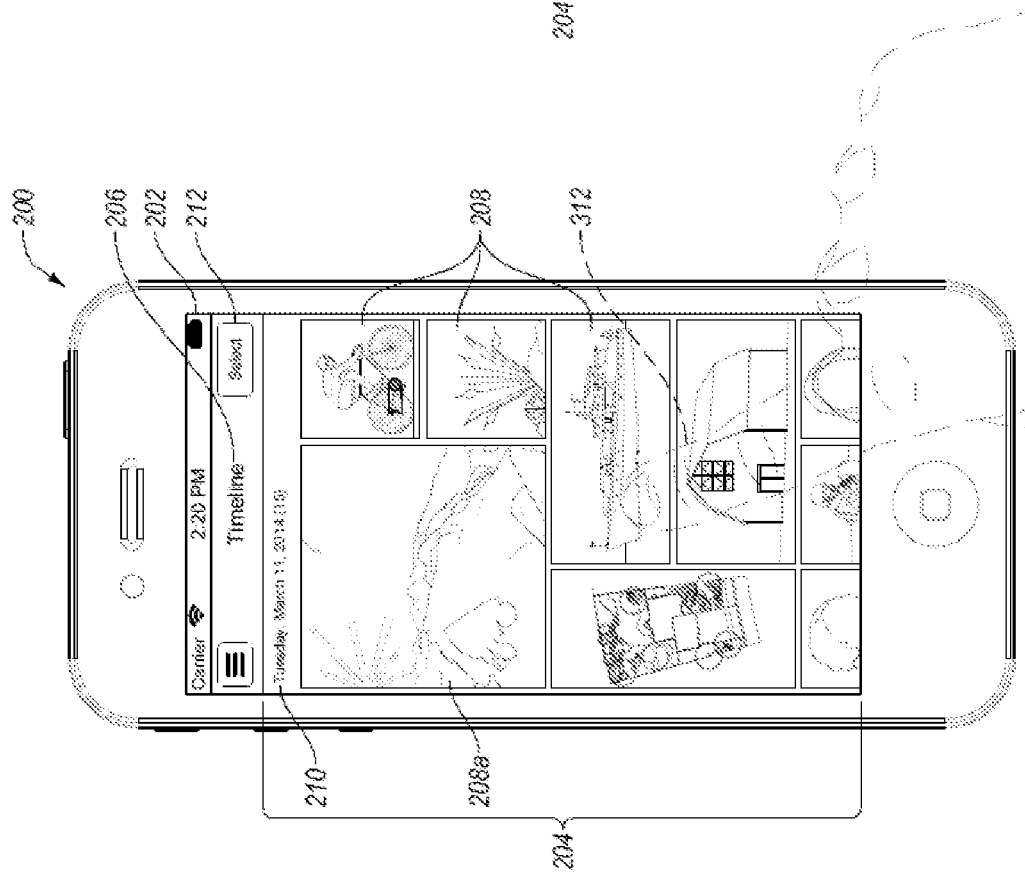

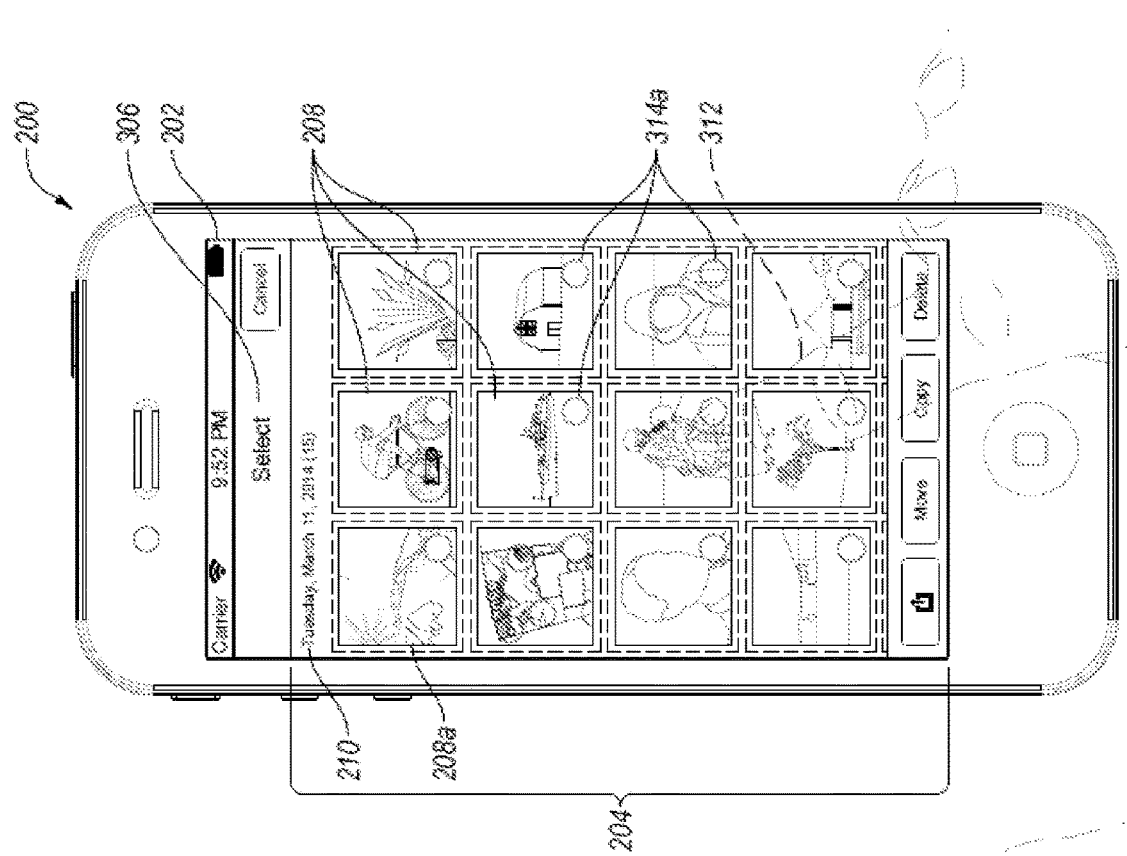
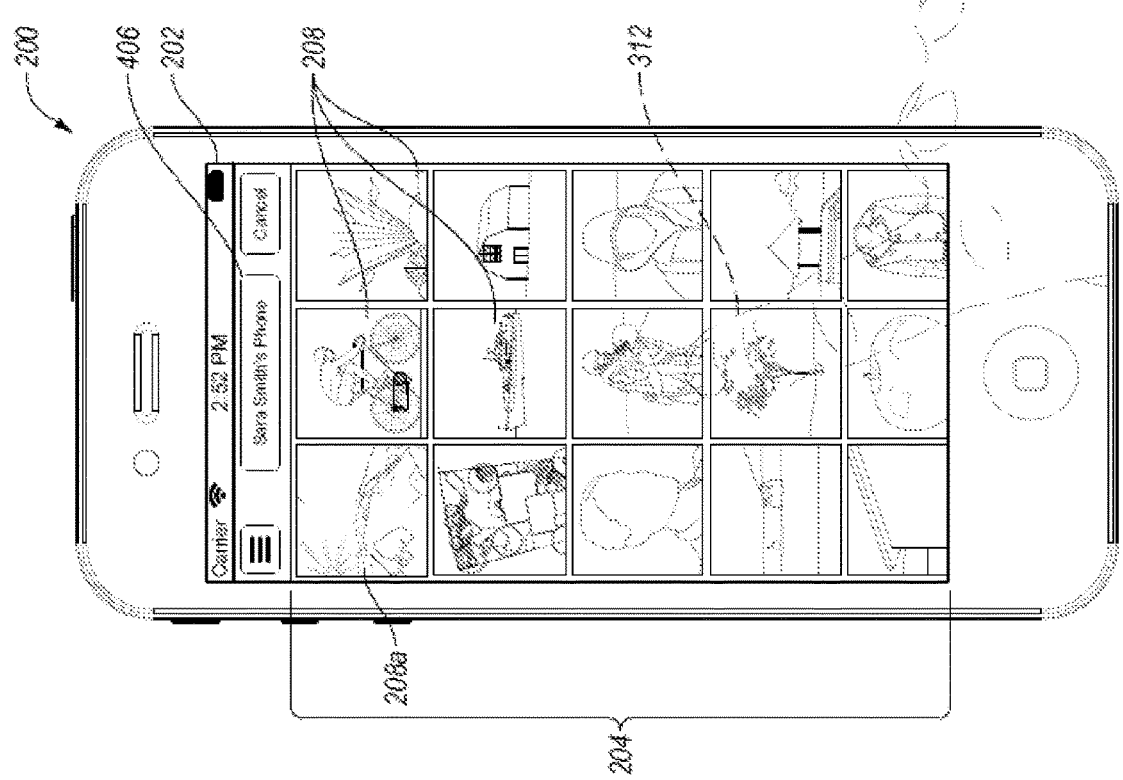
Fig. 4B
Fig. 4A

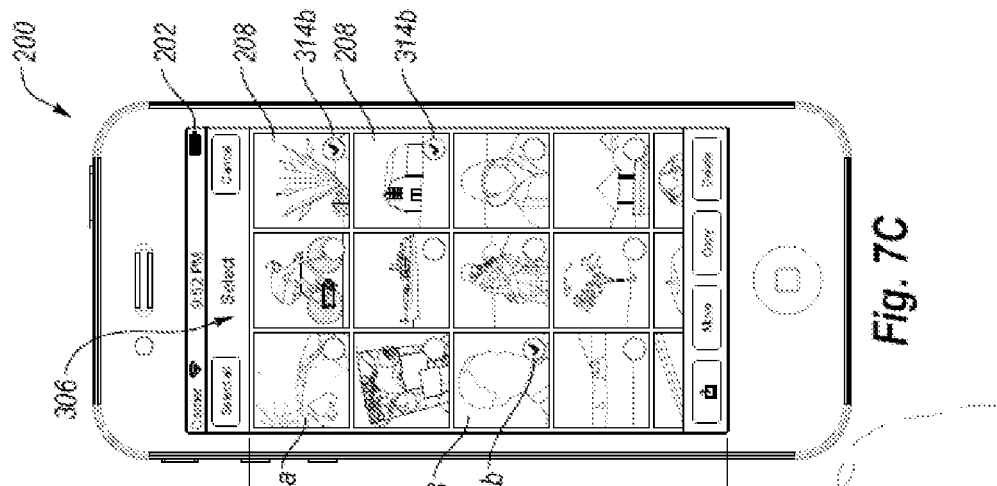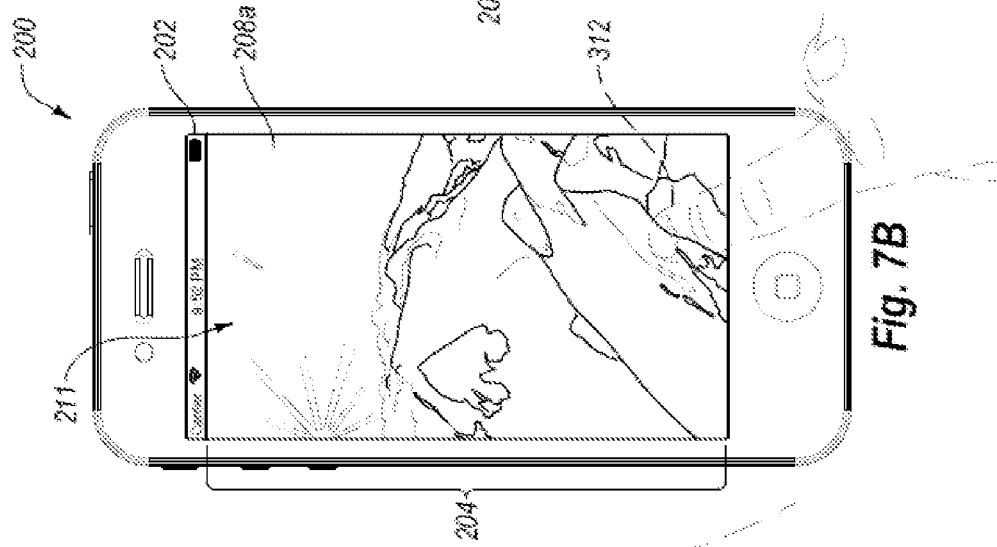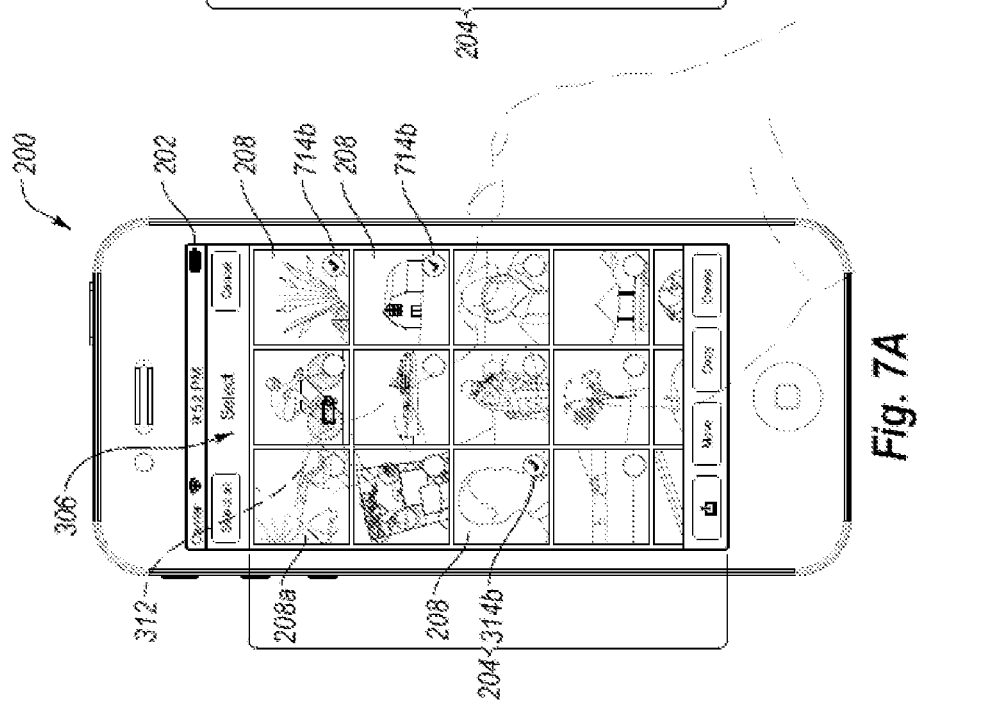

TECHNIQUES FOR COLLAPSING VIEWS OF CONTENT ITEMS IN A GRAPHICAL USER INTERFACE

CROSS-REFERENCES TO RELATED APPLICATIONS

This application is a continuation of U.S. patent application Ser. No. 17/210,375, filed Mar. 23, 2021, which is a continuation of U.S. patent application Ser. No. 16/051,136, filed Jul. 31, 2018, now issued as U.S. Pat. No. 10,963,446, which is a continuation of U.S. patent application Ser. No. 14/490,601, filed Sep. 18, 2014, now issued as U.S. Pat. No. 10,089,346, which is a continuation-in-part of U.S. patent application Ser. No. 14/262,520, filed Apr. 25, 2014, now issued as U.S. Pat. No. 9,891,794. Each of the aforementioned applications are hereby incorporated by reference in their entirety.

BACKGROUND OF THE INVENTION

1. Technical Field

One or more embodiments of the present invention relate generally to browsing and selecting content items, such as images, videos, music files, etc. More specifically, one or more embodiments of the present invention relate to graphical user interfaces that provide improved navigability by collapsing views of content items.

2. Background and Relevant Art

Electronic devices commonly have the ability to send, receive, and produce electronic multimedia. For example, a smart phone may send and receive digital photographs. A smart phone may also include a digital camera that takes digital photographs. It has become common for smart phone cameras to take pictures with increasing size. These digital photographs carry enough information to render bold colors, sharp contrast, and high levels of visual clarity.

Electronic devices that send, receive, and produce electronic multimedia (i.e., audio files, visual files) also typically have the ability to store the electronic multimedia. For example, a smart phone that takes digital photographs can also store those same digital photographs. Over time, an electronic device may be used to store large amounts of electronic multimedia. Users are often dismayed at how quickly the data storage of their electronic devices is filled.

Additionally, it has become increasingly common for a user to have multiple electronic devices that send, receive, and generate electronic media. A user may have a smart phone, a tablet, and a laptop that are all capable of sending, receiving, and generating electronic media. For example, the user may frequently take digital photographs with a smart phone. Then as the data storage on the smart phone fills up, the user may shuffle some digital photographs off the smartphone onto a laptop. The process of moving electronic media back and forth between electronic devices in order to free up data storage can be cumbersome and time consuming.

For this reason, it is increasingly common for a user to utilize additional storage in order to create a central repository for all the electronic media spread across the user's multiple electronic devices. External hard drives and cloud-based storage are two common types of additional storage that are used for this purpose. While utilizing additional storage may free up data storage on a user's electronic devices, the process of selecting electronic media files for transfer typically remains cumbersome and time-consuming.

The process of selecting electronic media files for transfer between electronic devices, to additional storage, to social media, or for printing is typically problematic in several ways. For example, a user who wants to only select a subset of the electronic media files on the electronic device must usually select that subset one-by-one. If this one-by-one selection is being performed on a touch screen of a hand held device, the user must typically go through and select each desired electronic media file individually. When a hand held device contains a large number of digital photographs, selecting individual photographs can be time-consuming and otherwise tedious.

Additionally, when a user is selecting individual electronic media files from a list or group of files in a selection interface, it may not be immediately clear what the electronic media is from the name of the electronic media file. For example, digital photographs are generally stored in files that are simply named with a timestamp that matches the date and time the digital photograph was taken. This naming convention generally offers no information as to the content or quality of the digital photograph. For this reason it has become common for selection interfaces to include thumbnail images.

Even though a thumbnail image includes a version of the image, the thumbnail image is usually not large enough to see the details of the image. This is especially true when several files are very similar. In order to see the details of the image, a user will generally open a larger preview of the image. Unfortunately, opening the larger preview typically requires the user to exit the selection interface. This is problematic when the user has already selected multiple files, as leaving the selection interface typically causes all the previously made selections to disappear upon returning to the selection interface. The process of selecting, opening for inspection, and re-selecting is typically cumbersome, lengthy, and inefficient.

In addition to the foregoing, traditional user interfaces traditionally require various buttons or toolbars to transition between different user interfaces or to perform other actions. Such buttons and toolbars can clutter user interfaces and otherwise detract from a user experience. For example, the inclusion of buttons and toolbars can reduce the available space for displaying photographs or other content items. The clutter due to buttons and toolbars is magnified when the user interface is presented on a hand-held or other device with a limited display size.

Thus, there are several disadvantages to current methods and system for browsing, selecting, and inspecting electronic files using conventional user interfaces.

BRIEF SUMMARY OF THE INVENTION

Embodiments of the present invention improve the navigability of content items in a graphical user interface by collapsing duplicate and/or similar (e.g., near-duplicate) content items, such that multiple content items are represented by a single representative content item. In some embodiments, an online content management service can identify an image characteristic for each image associated with a user's account in the online content management service. The online content management service can determine a subset of images. The online content management service can receive a request for an aggregate view of the user's images and cause the aggregate view to be displayed on a client device in which the subset of images are collapsed into a representative image in the aggregate view.

Additionally, in some embodiments, an online content management service can receive a selection of an image through a first graphical user interface, wherein the selected image represents multiple collapsed images. The online content management service can cause a second graphical user interface to be displayed on a client device, which includes the plurality of collapsed images. The online content management service can receive a selection of a collapsed image from the multiple collapsed images in the second graphical user interface, and receive a request to perform an action on the selected collapsed image. The online content management service can execute the action on the selected collapsed image.

Additional features and advantages of the present invention will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments of the invention and are not therefore to be considered to be limiting of its scope, the invention will be described and explained with additional specificity and detail through the use of the accompanying drawings in which:

FIGS. 3A-3B illustrate a transitioning between a content graphical user interface and a selection graphical user interface in accordance with one or more embodiments;

FIGS. 4A-4B illustrate a transitioning between another content graphical user interface and a selection graphical user interface in accordance with one or more embodiments;

FIGS. 7A-7C illustrate a transitioning between a selection graphical user interface, an enlarged view of a content item, and again to the selection graphical user interface while maintaining the selection state of multiple content items in accordance with one or more embodiments;

DETAILED DESCRIPTION OF THE INVENTION

Figure 1:
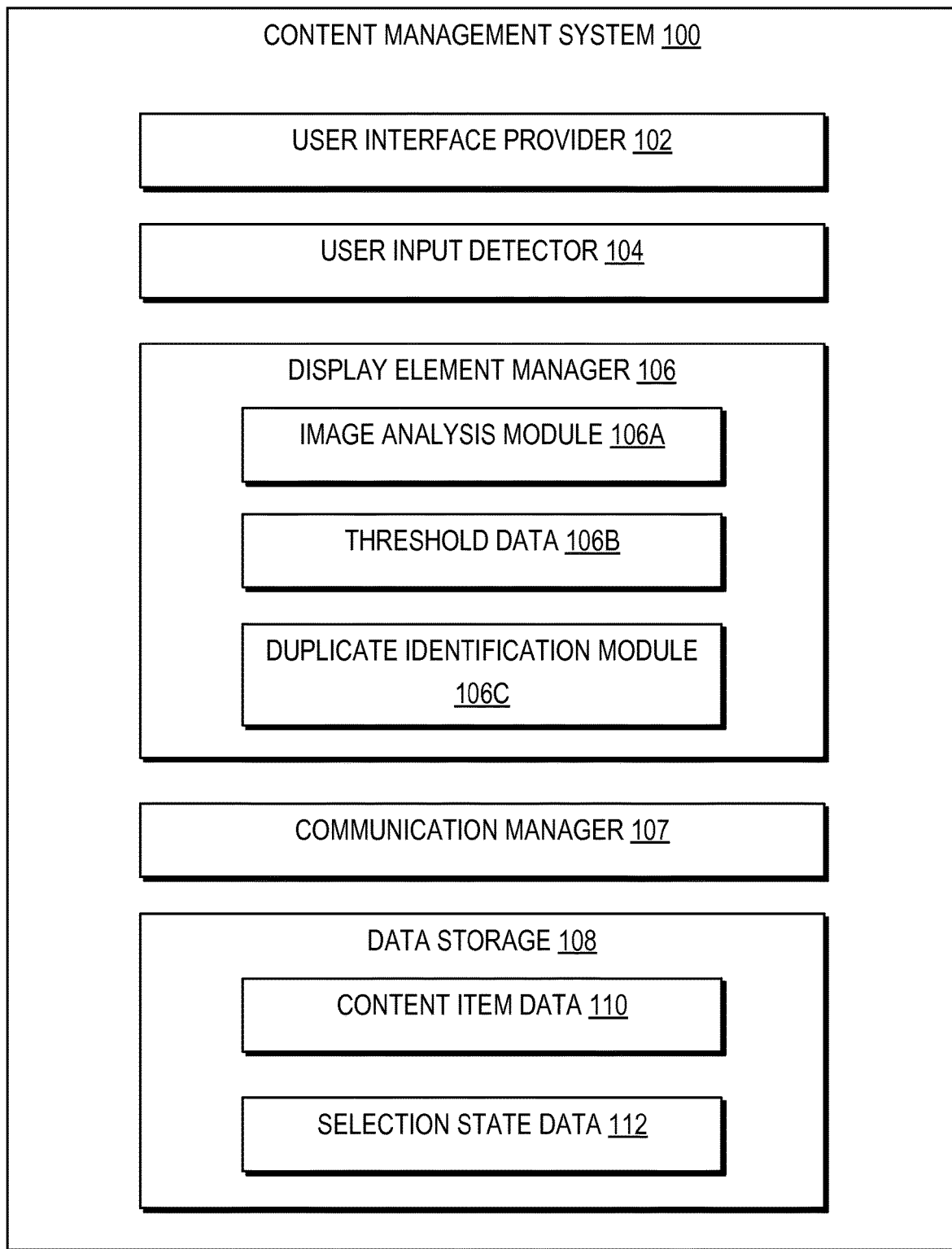
FIG. 1 illustrates a schematic diagram of a content management system in accordance with one or more embodiments.

One or more embodiments of the present invention include a content management system that provides users with efficient and effective user experiences when browsing, selecting, or inspecting content items. More specifically, one or more embodiments provide a user the ability to easily and effectively select content items by interacting with a user interface via one or more touch gestures. In particular, systems and methods described herein can allow a user to select multiple content items with a single user action or touch gesture. For example, the content management system can allow a user to select multiple content items using a swipe gesture. Thus, the content management system can allow a user to quickly select a subset of content items to share, print, or move without having to individually select (e.g., tap on each content item).

Additionally, one or more embodiments can provide a user the ability to easily and effectively inspect content items during a selection process. For instance, one or more embodiments allow a user to preview content items directly from a selection interface. Furthermore, systems and methods disclosed herein can allow a user to preview content items without disturbing the selection state of other content items, thereby saving the user the time and hassle of having to reselect content items after previewing a file. For example, one or more embodiments allow a user to select various content items in a selection interface, preview one or more content items, and return to the selection interface with the previous selections remaining intact.

In addition to the foregoing, content management system can provide a user with the ability to efficiently and effectively navigate between various user interfaces. For example, one or more embodiments allow a user to transition between a content graphical user interface and a selection interface based on touch gestures with content items. In other words, one or more embodiments allow a user to transition between various user interfaces without having to interface with user buttons or toolbars. As such, one or more embodiments can reduce user interface clutter by eliminating or reducing button and toolbars.

As used herein, a "digital content item" (or simply "content item") refers to digital data. In one or more embodiments, a content item can include a data file. Additional examples of content items include, but are not limited to, digital photos, digital video, digital audio, document files of all types, streaming content, contact lists, and/or folders that include one or more digital content items.

A "collection of digital content items" (or simply "collection"), as used herein, refers to one or more content items associated with one or more users. A collection can include a single type of content item or multiple different types of content items. In addition, a collection can include as few as one content item, but in many instances, a collection can include large numbers of content items.

FIG. 1 illustrates an example embodiment of a content management system 100. As shown, content management system 100 may include, but is not limited to, user interface provider 102, user input detector 104, display element manager 106, communication manager 107, and data storage 108. Each of components 102-108 of content management system 100 may be in communication with one another using any suitable communication technologies. One will appreciate in light of the disclosure herein that although components 102-108 are shown to be separate in FIG. 1, any of components 102-108 may be combined into fewer components, such as into a single facility or module, or divided into more components as may serve a particular embodiment. In addition, components 102-108 may be located on, or implemented by, one or more computing devices, such as those described below in relation to FIG. 16. Alternatively, portions of content management system 100 can be located on a computing device, while other portions of content management system 100 are located on, or form part of, an online content management system, such as that described below in reference to FIG. 17.

Components 102-108 can comprise software, hardware, or both. For example, components 102-108 can comprise one or more instructions stored on a computer readable storage medium and executable by processors of one or more computing devices. When executed by the one or more processors, the computer-executable instructions of content management system 100 can cause a computing device(s) to perform the methods described herein. Alternatively, components 102-108 can comprise hardware, such as a special purpose processing device to perform a certain function or group of functions. Additionally or alternatively, components 102-108 can comprise a combination of computer-executable instructions and hardware.

As mentioned above, and as shown in FIG. 1, content management system 100 can include user interface provider 102. User interface provider 102 can provide, manage, and/or control graphical user interfaces (or simply "user interfaces") that allow a user to view and interact with content items. For example, user interface provider 102 may display or otherwise provide various user interfaces that contain one or more content items in various layouts.

In one or more embodiments of the present invention, user interface provider 102 can provide a content graphical user interface. As used herein, the term "content graphical user interface" refers to a user interface that allows a user to browse or navigate a plurality of content items accessible to the user. For example, a content graphical user interface can display one or more content items in various sizes and at various positions in order to create a visually distinct display. In one or more embodiments, content items may be accessible to the user via the device upon which user interface provider 102 displays a content graphical user interface, and/or via remote storage available over a network connection (i.e., an online content management system as described below in reference to FIG. 17).

More specifically, user interface provider 102 can provide (e.g., by way of a display screen associated with a computing device) a variety of interactive elements within the user interface. For example, user interface provider 102 may cause a computing device to present a plurality of graphical objects that represent content items. For instance, user interface provider 102 can present reduced-size versions of content items, such as thumbnails or icons. In one or more embodiments, user interface provider 102 can present reduced-size versions of content items in a gallery formatted in a grid within a view area of a user interface as described below.

The user interface provider 102 can also provide a selection graphical user interface. As used herein, the term "selection graphical user interface" refers to a user interface that allows a user to select one or more content items. For example, a selection graphical user interface can allow a user to select one or more content items for transfer between electronic devices, to additional storage, to social media, for printing, or otherwise. The selection graphical user interface can display one or more content items.

User interface provider 102 can also redistribute one or more content items when transitioning between user interfaces. For example, and as will be described in more detail below, a user may perform one or more actions in response to which, the user interfaces provider can transition between user interfaces. Upon transitioning from one user interface to another, user interface provider 102 may redistribute the one or more content items or modify their position or sizes.

As mentioned above, and as illustrated in FIG. 1, content management system 100 may further include user input detector 104. User input detector 104 detects, receives, and/or facilitates user input in any suitable manner. In some examples, user input detector 104 detects one or more user interactions. As referred to herein, a "user interaction" means a single input, or combination of inputs, received from a user by way of one or more input devices. A user interaction can have variable duration and may take place anywhere on the graphical user interface provided by user interface provider 102 described above.

For example, user input detector 104 can detect a user interaction from a keyboard, mouse, touch screen, or any other input device. In the event a touch screen is utilized, user input detector 104 can detect one or more touch gestures that form a user interaction (e.g., tap gestures, swipe gestures, pinch gestures, or reverse pinch gestures) provided by a user by way of the touch screen. In some examples, the user input detector 104 can detect touch gestures in relation to and/or directed at one or more content items displayed as part of a user interface presented on the touch screen.

User input detector 104 may additionally, or alternatively, receive data representative of a user interaction. For example, user input detector 104 may receive one or more user configurable parameters from a user, one or more user commands from the user, and/or any other suitable user input. For example, the user input detector can receive voice commands or otherwise sense, detect, or receive user input.

As mentioned above, and as illustrated in FIG. 1, user interface system 100 may further include display element manager 106. Display element manager 106 can utilize the user input detected by user input detector 104 in order to manage elements of the display. For example, display element manager 106 can utilize detected user inputs to manage content items displayed in a graphical user interface. In one or more embodiments, one or more content items are selectable. Display element manager 106 may utilize detected user input to update the selection state of one or more content items. To illustrate, in a particular embodiment of the present invention, display element manager 106 utilizes a detected touch gesture to update the selection state of a content item from an unselected state to a selected state or vice versa.

In some embodiments, display element manager 106 can include image analysis module 106A, threshold data 106B, and near-duplicate identification module 106C. As described above, content management system 100 can be used to store different types of content items (including but not limited to text documents; email messages; text messages; other types of messages; media files such as photos, videos, and audio files; and/or folders containing multiple files). Users can view and navigate content items stored in their account through a graphical user interface, examples of which are described further below.

As the number of content items stored by a particular user increases, navigation of those content items through the graphical user interface can become increasingly difficult. This can be exacerbated when the user stores multiple copies (e.g., duplicate copies) of content items, or where the user stores similar content items (e.g., a number of digital photos captured in rapid succession, multiple versions of a text document, etc.). For example, multiple copies of a given image can be stored in multiple folders, and each folder can be shared with different users. For example, a user can create one folder to share images with friends and one folder to share images with family. To share an image with both family and friends, two copies of the image, one in each folder, can be stored in content management system 100. This can force the user to navigate through a number of duplicate, or near-duplicate content items consecutively, leading to a poor user experience. To address this issue and improve navigability of content items stored in content management system 100, duplicate and near-duplicate content items can be collapsed such that a single representative image (e.g., a thumbnail image) can be displayed in a graphical user interface.

In some embodiments, a representative image can be associated with multiple collapsed content items. In some embodiments, collapsed content items can be associated with metadata that identifies the content item as being collapsed. The metadata can further include an identifier of the representative image. When a timeline view is rendered by a client device, content items associated with metadata indicating the content item is collapsed can be hidden. When a representative image is selected from a graphical user interface, content management service 200 or a client device can use the metadata to identify associated content items to be displayed in a detail view graphical user interface. As used herein, when a content item is "collapsed" or shown in a "collapsed view", the content item is not displayed in the graphical user interface. Instead, the content item is associated with a representative image that is displayed in the graphical user interface.

Although examples herein are described with respect to images, similar analyses can be performed with respect to any content item available in an online content management system. Thus, any type of content item can be analyzed and icons representing duplicate, or near-duplicate, content items can be collapsed, improving the navigability of content items stored in the online content management system.

Image analysis module 106A can analyze each image stored in content management system 100 to identify image characteristics that can be used to determine whether the image is a duplicate or a near-duplicate of another image. In some embodiments, for a given image, image analysis module 106A can determine a content hash for the image by applying any of various cryptographic hash functions to the image. The resulting content hash value can be associated with the image as metadata. Content hashes can vary widely even if the contents of two images appear to be similar or if the images are of different formats (e.g., .gif, .jpeg, etc.). As such, image analysis module 106A can determine characteristics related to the visual content of images.

For example, in some embodiments, an edge detection algorithm can be used to identify locations of edge intersections in a given image. The locations of edges within an image (e.g., a pixel location, or cluster of pixel locations) can be added to the image's metadata and compared with edge locations from one or more other images to determine whether the images are duplicates or near-duplicates. In some embodiments, reduced size versions of images, such as thumbnails, can be analyzed by image analysis module 106A. Reduced size images can include less detail than full size images, reducing small differences between images. For example, an edge detection algorithm can be applied to a thumbnail image and those edge locations can be compared to edge locations in other thumbnail images. In some embodiments, other image content characteristics can also be used. For example, color values for each pixel, or a subset of pixels, in a thumbnail image can be determined and compared to color values in a different image thumbnail. Clusters of pixels having the same or similar color values can be identified, and the locations of these clusters can be added to the image metadata. In some embodiments, an image histogram, where each bin corresponds to a different color value, can be calculated and compared with image histograms of other images.

Threshold data 106B can include threshold values for each of the characteristics calculated by image analysis module 106A. For example, a temporal threshold can be defined (e.g., one second), which can be compared to the difference between the timestamps of two or more images. Other threshold values can include a value representing the difference between the locations of edges in images, or the difference in the number of pixels having a particular color value. In some embodiments, threshold values can be statically defined and applied to each image. In some embodiments, threshold values can be dynamically determined specifically for the images being compared, based on image metadata, such as image timestamps. For example, in some embodiments, an image's timestamp can be normalized to fall within a value of zero to one, where the more recent a timestamp, the closer the corresponding normalized timestamp approaches one. The statically defined threshold can then be divided by the normalized timestamp. As such, when comparing recent images, the threshold values applied will approach the statically defined threshold value, and comparisons between older images will apply larger threshold values that increase as the age of the image ages. Thus, by applying larger threshold values to older images, older images with larger differences can be determined to be near-duplicates and collapsed.

Using the thresholds defined in threshold data 106B and the image characteristics determined by image analysis module 106A, duplicate identification module 106C can identify duplicate and near-duplicate images stored in content management system 100. In some embodiments, duplicate identification module 106C can compare all images stored in content management system 100. In some embodiments, duplicate identification module 106C can compare subsets of images stored in content management system 100. For example, duplicate identification module 106C can compare images stored in the same folder. In some embodiments, a subset of images to be compared by duplicate identification module 106C can be defined as all images associated with a timestamp within a given time period. The time period used can be statically defined (e.g., compare all images within a predefined time period) or can vary depending on the age of an image. For example, all images may be displayed in a timeline view ordered by timestamp data associated with each image. As the user browses to older images, the time window can be increased, making it more likely to collapse duplicate or near-duplicate images that are older. This can reduce clutter associated with older and potentially less relevant images, compared to more recent images.

Although particular examples of image characteristics have been described above for use in identifying duplicate and near-duplicate images, alternative characteristics may also be used. For example, images can be associated with tags that can identify characteristics of the images (location, persons shown in an image, etc.). In some embodiments, duplicate identification module 106C can identify images that share the same tags, and collapse those images as near-duplicates. Additionally, in some embodiments, threshold values may vary depending on the client device in use. For example, content management system 100 can detect that a user is browsing images from a mobile device, with a smaller screen than a desktop device, and adjust threshold values to collapse more images than would be used if the user were browsing images from a desktop device.

Image analysis module 106A, threshold data 106B, and near-duplicate identification module 106C are described above as being implemented on content management system 100, however in some embodiments, these modules can be implemented on each client device and used to analyze content items received from content management system 100.

The content management system 100 may further include communication manager 107. Communication manager 107 can facilitate receiving and sending data to and from content management system 100, or a device upon which the content management system 100 is implemented. In particular, communication manager 107 can facilitate sending and receiving of content items. For example, communication manager 107 can instruct or activate one or more communication interfaces of a computing device, as described below to send or receive data. Furthermore, communication manager 107 can package or format content items to be sent or received from content management system 100 in any necessary form that is able to be sent through one or more communication channels and using an appropriate communication protocol, as described further below with reference to FIG. 17.

As discussed above, user interface system 100 can include data storage 108, as illustrated in FIG. 1. Data storage 108 may maintain content item data 110 representative of data associated with content items. For example, content item data 110 can include content item files, metadata associated with content items, reduced-sized files, and other similar type data that content management system 100 may use in connection with presenting a collection of content items by way of a user interface. In particular, content item data 110 can include information that allows content management system 100 to organize or display content items. In one or more embodiments, content item data 110 may be stored on a client device, and/or may be stored on remote storage available over a network connection (i.e., an online content management system as described below in reference to FIG. 17).

Data storage 108 can also include selection state data 112. Selection state data 112 can include an indication of whether particular content items have a selected state or an unselected state. Furthermore, as described in greater detail below, the data forming the selection state data 112 can comprise persistent data. In other words, the content management system 100 can maintain selection state data 112 irrespective of whether a selection graphical user interface or other user interface is currently in display.

As will be described in more detail below, each of components 102-112 can provide, alone and/or in combination with the other components of the content management system 100, one or more graphical user interfaces. In particular, components 102-112 can allow a user to interact with a collection of content items to inspect and select content items for a variety of purposes. In particular, FIGS. 2-10 and the description that follows illustrate various example embodiments of the user interfaces and features that in accordance with general principles of described above.

Figure 2B:
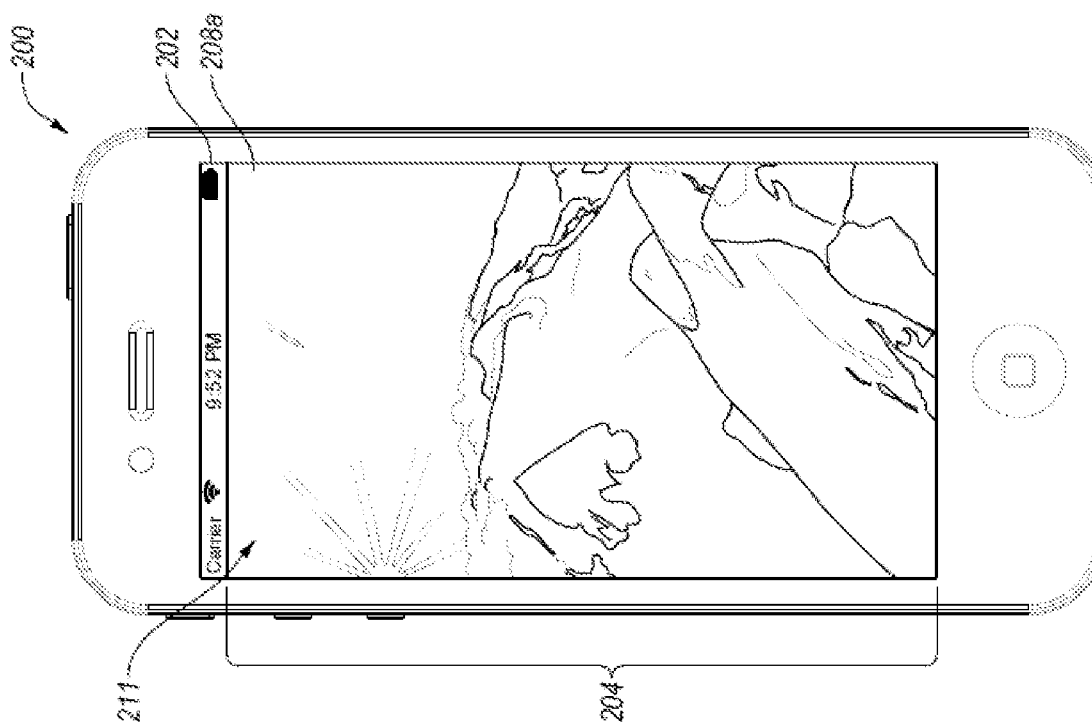
FIGS. 2A-2B illustrate content graphical user interface displaying content items in accordance with one or more embodiments.
Figure 2A:
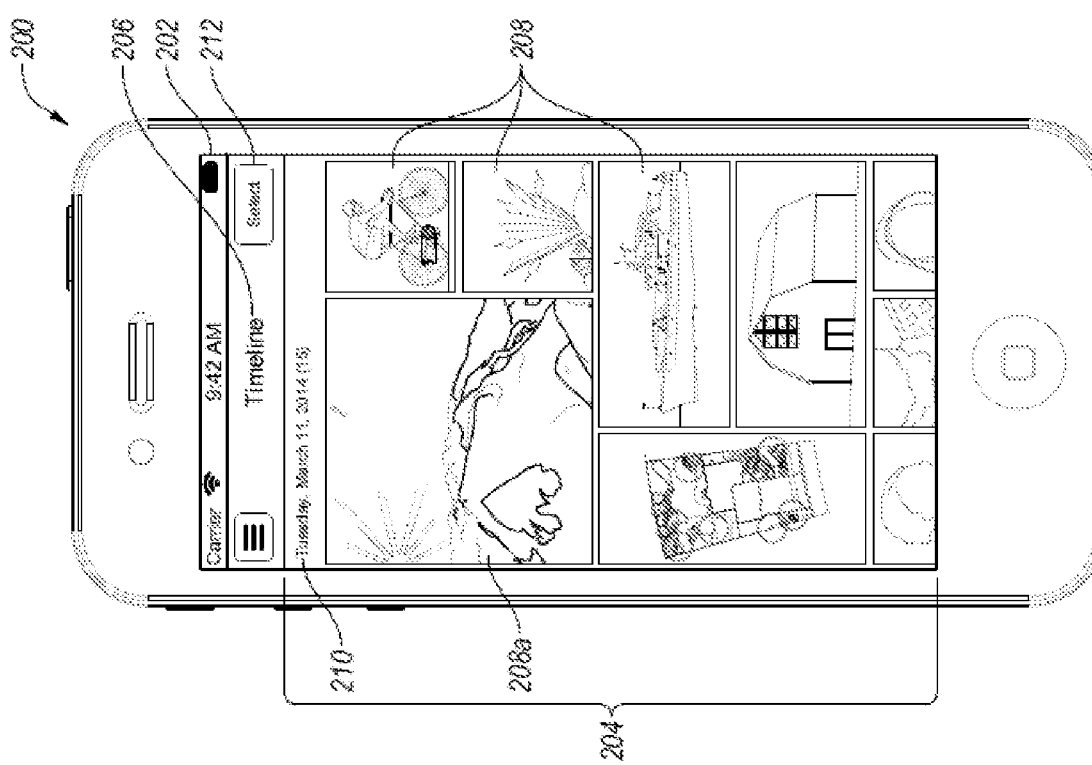

In some examples, a computing device can implement part or all of content management system 100. For example, FIG. 2A illustrates computing device 200 that may implement one or more of components 102-112 of content management system 100. As illustrated in FIG. 2A, computing device 200 is a handheld device, such as a mobile phone device (e.g., a smartphone). As used herein, the term "handheld device" refers to device sized and configured to be held/operated in a single hand of a user. In additional or alternative examples, however, any other suitable computing device, such as, but not limited to, a tablet device, a handheld device, larger wireless devices, a laptop or desktop computer, a personal-digital assistant device, and/or any other suitable computing device can perform one or more of the processes and/or operations described herein.

Computing device 200 can include any of the features and components described below in reference to computing device 1600 of FIG. 16. As illustrated in FIG. 2A, computing device 200 includes a touch screen 202 that can display or provide user interfaces and by way of which user input may be received and/or detected. Additionally or alternatively, computing device 200 may include any other suitable input device, such as a touch pad or those described below in reference to FIG. 16.

FIG. 2A illustrates touch screen 202 of computing device 200 displaying one embodiment of a content graphical user interface, in particular a timeline graphical user interface 206. As mentioned above, a content graphical user interface can display content items and allow a user to view or browse a collection of content items accessible to the user. For ease in description, the figures and the following description include content items that are digital photographs or thumbnail image versions of digital photographs. One will appreciate in light of the disclosure herein that alternative embodiments can include additional or different content items, such as music files, video files, data files, or other data as described herein.

Timeline graphical user interface 206 includes a view area 204 displaying multiple content items 208 arranged in a navigable grid. A timeline graphical user interface 206 refers to a content graphical user interface in which content items are arranged in a timeline or chronologically. For example, timeline graphical user interface 206 positions the oldest content items at one end (e.g., the bottom) and the newest digital photos near an opposing end (e.g., the top). A user can navigate through content items 208 by moving content items 208 vertically through view area 204. In one embodiment, the user can interact with view area 204 using vertical swipe gestures to browse the content items 208. In particular, as a user swipes vertically up or down, content items 208 can move into and out of view area 204.

One will appreciate that timeline graphical user interface 206 is only one example of a content graphical user interface. In alternative embodiments, content graphical user interfaces are arranged using other, or multiple, ordering schemes. For example, content graphical user interfaces can include content items arranged by date, location, size, origin device, type, subject matter of the content item (i.e., people, places, topics) and any other content item characteristic.

In any event, in one or more embodiments content graphical user interfaces can group content items to aid in user browsing. Furthermore, content graphical user interfaces can include headings to identify groups of content items. For example, FIG. 2A illustrates that timeline graphical user interface 206 includes a date indicator 210 heading. Date indicator 210 displays a date associated with one or more content items 208 in view area 204. For example, when content items 208 are thumbnail images associated with photograph files, date indicator 210 can comprise a date upon which each photograph file was created (e.g., when each picture was taken). Date indicator 210 may also include an indication of how many content items 208 are associated with the date shown (i.e., "15"). In alternative embodiments, headings can comprise another indication of how content items are grouped. For example, when content items are grouped by location (i.e., where the photographs were taken), the headings can comprise a name of a location. In alternative embodiments, the headings can comprise names of individual or subject matter, event names, or other group identifiers.

Content graphical user interfaces can arrange content items in a visually pleasing manner. For example, FIG. 2A illustrates that timeline graphical user interface 206 displays content items 208 at various locations and in a variety of sizes. Some content items 208 are square, while other content items 208 are rectangular. Additionally, some content items 208 are small, while other content items 208 are large. One will appreciate that in alternative embodiments the content items 208 can each have the same size, shape, or orientation. Furthermore, in one or more embodiments a user can select or otherwise configure an appearance (size, shape, etc.) of content items 208.

For example, a user can press and hold a particular content item 208 to resize the content item 208. In particular, the user input detector 104 can detect duration of the press and hold and the user interface provider 102 can size the content item 208 based on the duration of the press and hold. Alternatively, a user can resize content items 208 in a content user interface using a pinch out gesture. For example, the user input detector 104 can detect a size of a pinch out gesture and the user interface provider 102 can size the content item 208 based on the size of the pinch out gesture.

When browsing a collection, a user may desire to preview a content item 208. For example, in the context of digital photos a user may desire to view an enlarged version of a thumbnail image. In the context of videos or music, a user may desire to hear or see a sample portion of the content item. Content management system 100 can allow a user to preview content items 208. In particular, upon a user performing a first user interaction on a content item 208a, content management system 100 can provide a preview of content item 208a. For example, upon a user tapping a content item 208a, content management system 100 can provide a preview of the content item 208a. For example, FIG. 2B illustrates that content management system 100 can open an enlarged view 211 of content item 208a. In alternative embodiments, a pinch out or other user interaction or gesture can cause content management system 100 to provide a preview of a content item 208a.

The enlarged view 211 of content item 208a can allow a user to more easily inspect content item 208a. As illustrated by FIG. 2B, in one or more embodiments, the enlarged view 211 of content item 208a can entirely fill the view area 204. In alternative embodiments, the enlarged view 211 of content item 208a can fill only a portion (e.g., ¾, ½, ¼) of view area 204.

Content management system 100 can also close the enlarged view of content item 208a and return to timeline graphical user interface 206. In particular, upon a user performing a predetermined user interaction on a content item 208a, content management system 100 can close the preview of content item 208a. In one or more embodiments the predetermined user interaction to close the preview can be the same user interaction that caused content system 100 to open the preview. For example, upon a user tapping the enlarged view 211 of content item 208a, content management system 100 can close the enlarged view 211 and transition to timeline graphical user interface 206 or another content graphical user interface. In alternative embodiments, a pinch in or other user interaction or gesture can cause content management system 100 to close a preview of content item 208a. Still further the enlarged view 211 can include an "X" box or other UI element that the user can select to close the enlarged view 211. Alternatively or additionally, content management system 100 can close the enlarged view 211 without user interaction after a predetermined amount of time.

One will appreciate that timeline graphical user interface 206 (and other content graphical user interfaces) can allow a user to browse various content items 208 in a collection. A user may desire to select various content items. For example, upon browsing content items 208 via timeline graphical user interface 206, a user may desire to print various content items 208, share various content items via a social network, delete various content items, or otherwise select one or more content items 208 to perform a desired function with the content items 208. In order to allow a user to select content items, content management system 100 can transition from timeline graphical user interface 206 to a selection graphical user interface that allows a user to select content items.

As shown by FIG. 2A, timeline graphical user interface 206 can include a select element 212. User selection of select element 212, content management system 100 can initiate a transitioning from timeline graphical user interface 206 to a selection graphical user interface. One will appreciate that as select element 212 is located at a top end of timeline graphical user interface 206, a user may need to move a finger or other input device across the view area 204 in order to select the select element 212. When a user is manipulating the computing device 200 in a single hand, reaching select element 212 may be difficult or awkward.

In one or more embodiments, content management system 100 can transition from timeline graphical user interface 206 (or another content graphical user interface) to a selection graphical user interface upon detecting a predetermined user interaction with a content item 208 or other portion of the view area 204. For example, FIG. 3A illustrates upon a performing a press and hold gesture on a content item 208 using a finger 312, content management system 100 can transition from timeline graphical user interface 206 (FIG. 3A) to selection graphical user interface 306 (FIG. 3B). In alternative embodiments, a double tap, a triple tap, a tap with two fingers, a horizontal swipe, or other user interaction or gesture can cause content management system 100 to transition from timeline graphical user interface 206 (FIG. 3A) to selection graphical user interface 306 (FIG. 3B).

One will appreciate in light of the disclosure herein that allowing a user to perform a predetermined interaction or touch gesture on a content item 208 or another spot in the view area 204 to transition to selection graphical user interface 306 more easily allow a user to open selection graphical user interface 306. In particular, a user need not reach select element 212 at a top of the timeline graphical user interface 206 but rather can use any portion of the user interface to perform the predetermined interaction or touch gesture. Thus, the content management system 100 can allow a user to easy transition between user interfaces or modes using a single hand. Furthermore, in one or more embodiments content graphical user interfaces, such as timeline graphical user interface 206, can omit select element 212 to reduce UI clutter and provide increased space for displaying content items 208.

In one or more embodiments, the user interaction or touch gesture that causes content management system 100 to transition from timeline graphical user interface 206 (FIG. 3A) to selection graphical user interface 306 (FIG. 3B) can be different from the user interaction or touch gesture that causes content management system 100 to provide a preview of a content item 208. For example, a single tap on a content item 208 in a content graphical user interface can cause content management system 100 to open a view, while a double tap or press and hold on the same content item 208 can cause content management system 100 to transition to selection graphical user interface 306. As such, the user input detector 104 can recognize or distinguish between different user interactions. For example, user input detector 104 can detect a duration of a user interaction to determine if the user interaction is a tap or a press and hold. Along related lines, user input detector 104 can determine a surface area affected (i.e., touched) by a user interaction to distinguish between a single finger tap or double or triple finger tap. In any event, user input detector 104 can detect and identify user interactions and perform an action based on which user interaction or gesture is detected or identified.

As shown by FIG. 3B, in one or more embodiments transitioning to selection graphical user interface 306 can involve resizing and/or redistributing one or more content items 208. For example, selection graphical user interface 306 can include content items 208 each sized to a default square configuration as shown in FIG. 3B. Alternatively, selection graphical user interface 306 can leave content items 208 in the same configuration as timeline graphical user interface 206 (FIG. 3A).

In any event, selection graphical user interface 306 can allow a user to select or unselect content items 208 via one or more user interactions or touch gestures. For example, each content item 208 in selection graphical user interface 306 can include a first selection indicator 314a or second selection indicator 314b. Selection indicators can comprise an icon or other graphical user element that can indicate a selection state (i.e., selected or unselected). For example, FIG. 3B illustrates that the first selection indicator 314a comprises an empty circle and can indicate that an associated content item 208 has a selection state of un-selected. In alternative embodiments, the first selection indicator 314a can comprise an empty square, another icon, or an absence of a second selection indicator 314b. Second selection indicator 314b can comprise a checkmark and can indicate that an associated content item 208 has a selection state of selected. In alternative embodiments, the second selection indicator 314b can comprise a border around a content item 208, a bolding or highlighting of a content item 208, changing the color scheme (e.g., to color, black and white, or sepia), altering image brightness and color saturation, or resizing the image, or other icon or visual effect.

Selection graphical user interface 306 can further include one or more selectable selection mode operation options 316. Selection mode operation options 316 can provide the user with options as to how to handle the selected content items 208. For example, selection mode operation options 316 can allow a user to share, move, edit, rename, group, copy, delete, or undergo any other file transfer/transformation action.

As previously mentioned, timeline graphical user interface 206 is one example of a content graphical user interface. FIG. 4A illustrates another example of a content graphical user interface 406. Content graphical user interface 406 is a general content graphical user interface in which content items 208 are randomly arranged or arranged by an order of addition to the collection of content items 208. As such, content graphical user interface 406 does not include a heading, such as date indicator 210.

As shown in FIG. 4A, content graphical user interface 406 does not include a select element 212. As such in order to transition to selection graphical user interface 306, a user may perform a predetermined user interaction on a content item 208 or another spot within view area 204 as explained above in relation to transitioning between time user interface 206 and selection graphical user interface 306. For example, FIG. 4A illustrates upon a performing a press and hold gesture on a content item using a finger 312, content management system 100 can transition from content graphical user interface 406 (FIG. 4A) to selection graphical user interface 306 (FIG. 4B). In alternative embodiments, a double tap, a triple tap, a tap with two fingers, a horizontal swipe, or other or other user interaction or gesture can cause content management system 100 to transition from content graphical user interface 406 (FIG. 4A) to selection graphical user interface 306 (FIG. 4B).

In order to signal the transition from one type of user interface to another type of user interface, content management system 100 can provide an animation. For example, and as illustrated by FIGS. 4A and 4B, the transition from content graphical user interface 406 to selection graphical user interface 306 may be accompanied by a pulse animation. As shown in FIG. 4B, user interface provider 102 can cause content items 208 to become momentarily smaller from their original size (indicated by dashed line boxes around each content item 208). The pulse animation can last a short time before the user interface provider 102 returns content items 208 to their original size. When the pulse animation ends, content items 208 are with selection indicators 314a, 314b. In alternative embodiments the animation accompanying a transition between user interfaces can comprise a wobble, a rotation, a fade in and fade out, or other animation.

Figure 5B:
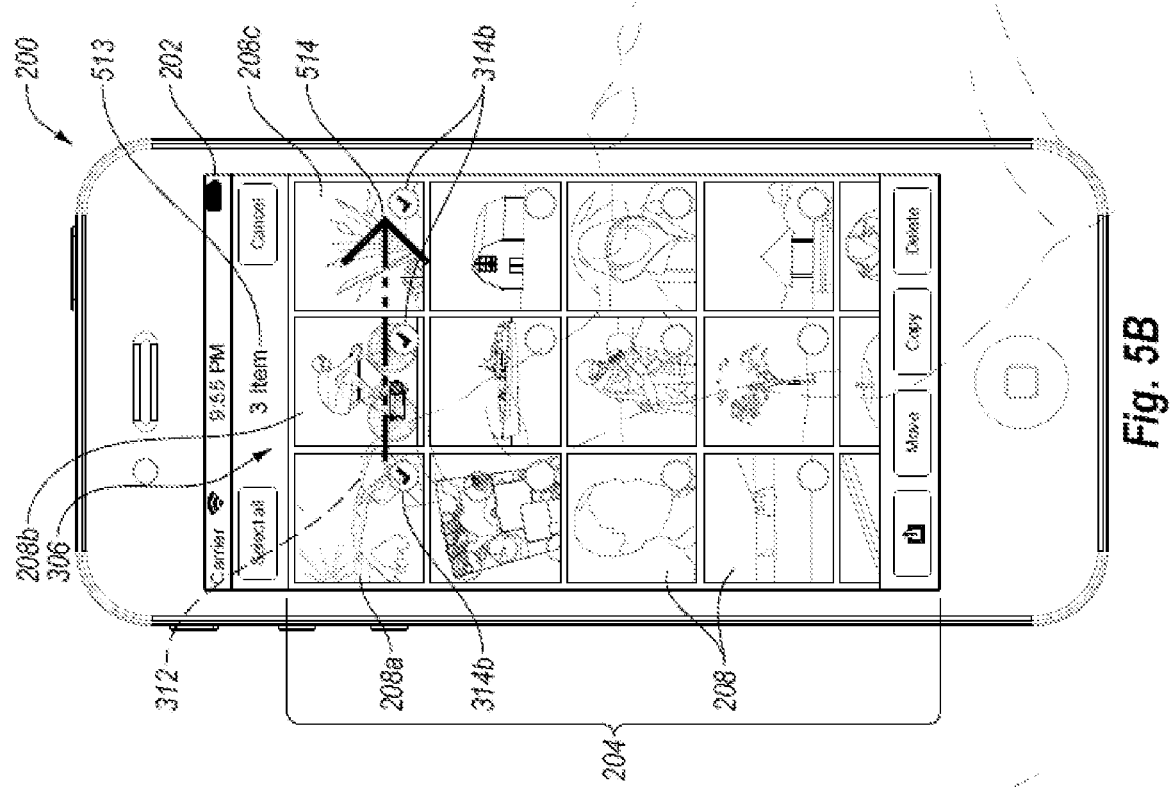
FIGS. 5A-5B illustrate a user selecting multiple content items with a single user interaction in accordance with one or more embodiments.
Figure 5A:
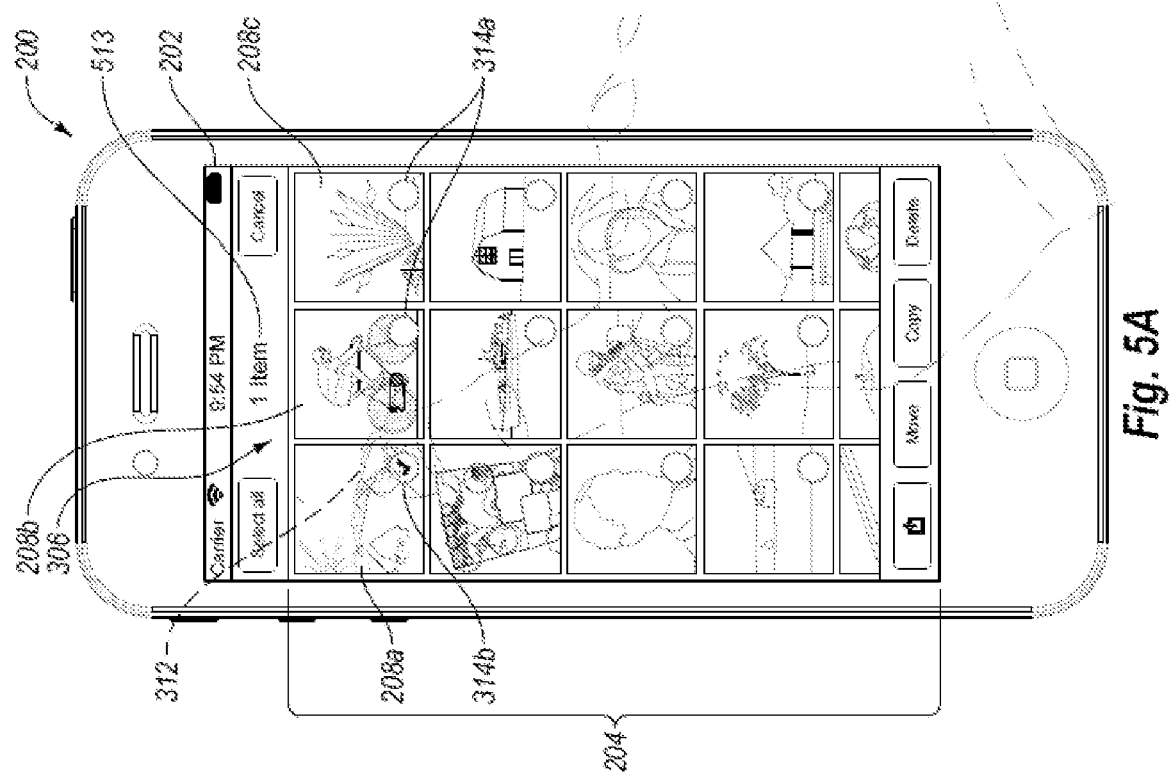

As previously mentioned, content management system 100 can allow a user to select or unselect content items 208 while in selection graphical user interface 306. In particular, upon a user performing a predetermined user interaction on a content item 208, content management system 100 can change a selection state of the content item 208. For example, upon a user tapping a content item 208a, content management system 100 can invert a selection state of the affected content item 208a. For example, FIG. 5A illustrates that content management system 100 can change a selection state of content item 208a from unselected to selected (indicated by changing first selection indicator 314a to second selection indicator 314b) upon detecting a user tap on content item 208a. Furthermore, upon changing a content item from unselect to select, or vice versa, user interface provider 102 can update a selection count 513 that indicates a total number of content items 208 currently selected. In alternative embodiments, a double tap or other user interaction or gesture can cause content management system 100 to change or invert a selection state of a content item 208.

In addition to selection a single content item at a time, content management system 100 can allow a user to select multiple content items 208 with a single user interaction or touch gesture. For example, as illustrated by FIG. 5B, a user can make a swipe gesture as indicated by arrow 514. The user input detector 104 can detect the user interaction (i.e., swipe 514) and can identify each content item 208a, 208b, 208c affected by the swipe gesture 514. A content item is affected by a swipe gesture when the swipe gesture crosses or touches any portion of the content item. For example, as shown in FIG. 5B, a swipe gesture 514 may start at content item 208a in the corner of the top row of content items 208 and move across the top row touching or crossing content items 208b and 208c. Content management system 100 can invert a selection state of each of the affected content items 208a, 208b, 208c. When display element manager 106 recognizes a content item 208 as being selected, user interface provider 102 causes the selection indicator 314a associated with the selected content item 208a, 208b, 208c to change to a display a checkmark, as shown. In this way, a user may select multiple content items 208 with a single touch gesture.

User input detector 104 can thus detect a starting point of a swipe gesture (i.e., an initial touch point), a path of the swipe gesture, and an ending point (i.e., lift off point) of the swipe gesture. User input detector 104 can then determine each content item 208 touched by the starting point, path, and ending point of the swipe gesture. User input detector 104 can then indicate the affected content items 208 to display element manager 106, which can then invert a selection state of each affected content item 208.

FIG. 5B illustrates a horizontal swipe gesture, but it will be understood that a swipe gesture may also include vertical, diagonal, or combination thereof. For example, in another embodiment, the selection graphical user interface 306 may include a scroll lock that locks view area 204 from scrolling vertically. When view area 204 is locked in this manner, vertical swipes may be permitted because they would not be interpreted as an attempt to scroll content items 208 through the view area 204. A user can activate the scroll lock by selection of a graphical user interface element or by performing a predetermined gesture.

In alternative embodiments selection graphical user interface 306 can include a scroll bar that allows a user to scroll content items 208 through view area 204. In particular, a user can press and slide the scroll bar along a scroll path to cause content items 208 to pass through view area 204. In such embodiments, user input detector 104 can identity any or all content items 208 affected by any type of swipe gesture (horizontal, vertical, diagonal, other patterns, or combinations thereof). For example, user input detector 104 can detect an S-shaped swipe that starts at the end of row, moves across the row, moves to the next row down, and continues back in the other direction. In this manner, an uninterrupted S-shaped swipe may eventually move back-and-forth across all content items 208 in the view area 204. In a particular embodiment, a user can select all content items 208 in the view area 204 with an S-shaped swipe, scroll the view area 204 until unselected content items 208 are displayed, and continue the S-shaped swipe to select further content items 208. Other swipe patterns may include square-shaped swipes, X-shaped swipes, zig-zag-shaped swipes, etc.

In still further embodiments, user input detector 104 can detect a direction of a swipe gesture. If the swipe gesture is horizontal or within a predetermined range of degrees from horizontal (i.e., 0 degrees to 45 degrees), display element manager 106 can invert a selection state of each content item 208 affected by the swipe gesture. If the swipe gesture is vertical or within a predetermined range of degrees from vertical (i.e., 0 degrees to 44 degrees), user interface provider 102 can scroll content items 208 through view area 204 rather than selecting content items 208.

One will appreciate in light of the disclosure herein that "horizontal" and "vertical" directions can be arbitrary. For example, a user can rotate computing device 200. Upon rotation a "horizontal" direction can become a "vertical" direction. In such embodiments, horizontal swipes can scroll content items 208 through view area 204, while vertical swipes select content items 208. Alternatively, even in an upright position (as shown by FIGS. 2A-8B), horizontal swipes can scroll content items 208 through view area 204, while vertical swipes select content items 208.

As noted above, content management system 100 can invert a selection state of any content items 208 affected by a swipe gesture, a tap gesture, or other predetermined gesture made in selection graphical user interface 306. In particular, if an affected content item 208 has an initial selection state of unselected, content management system 100 can invert (i.e., change) the selection state from unselected to selected. Along related lines, if an affected content item 208 has an initial selection state of selected, content management system 100 can invert (i.e., change) the selection state from selected to unselected.

Figure 6B:
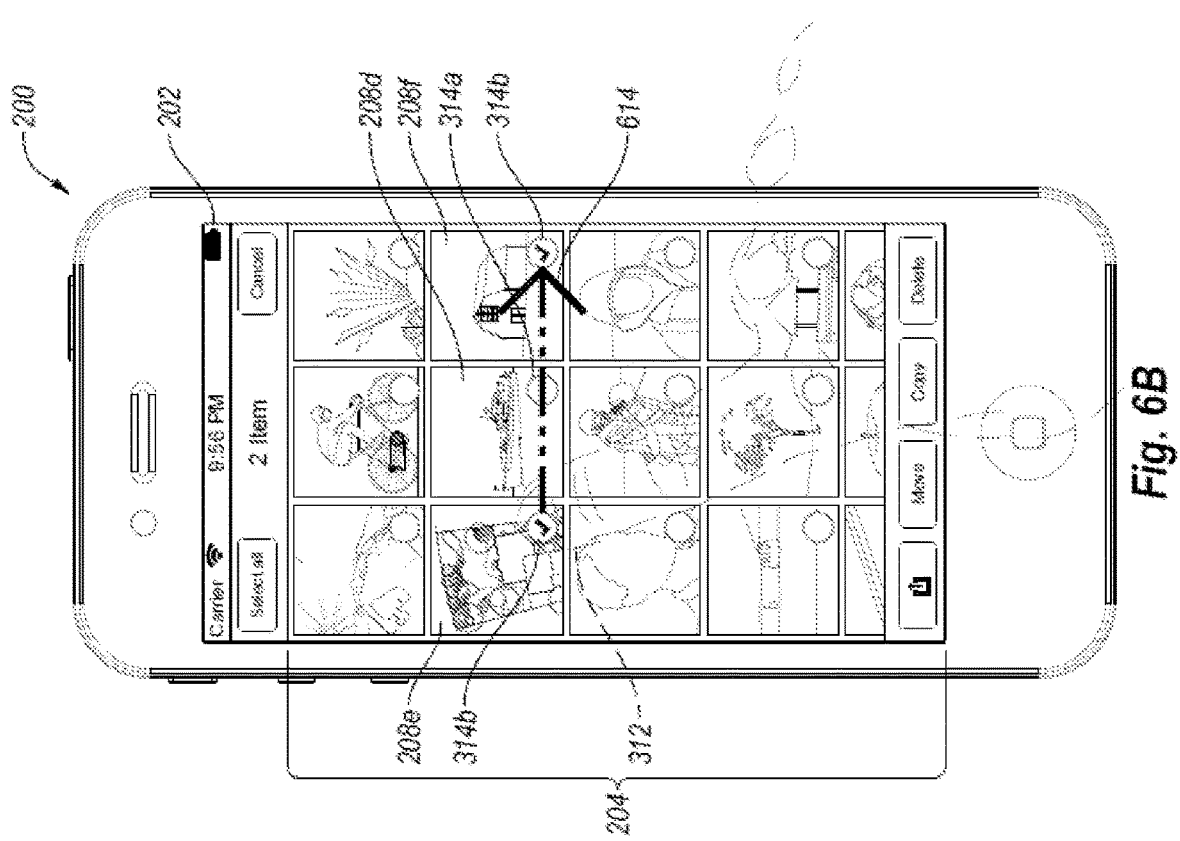
FIGS. 6A-6B illustrate a user inverting the selection state of multiple content items with a single user interaction in accordance with one or more embodiments.
Figure 6A:
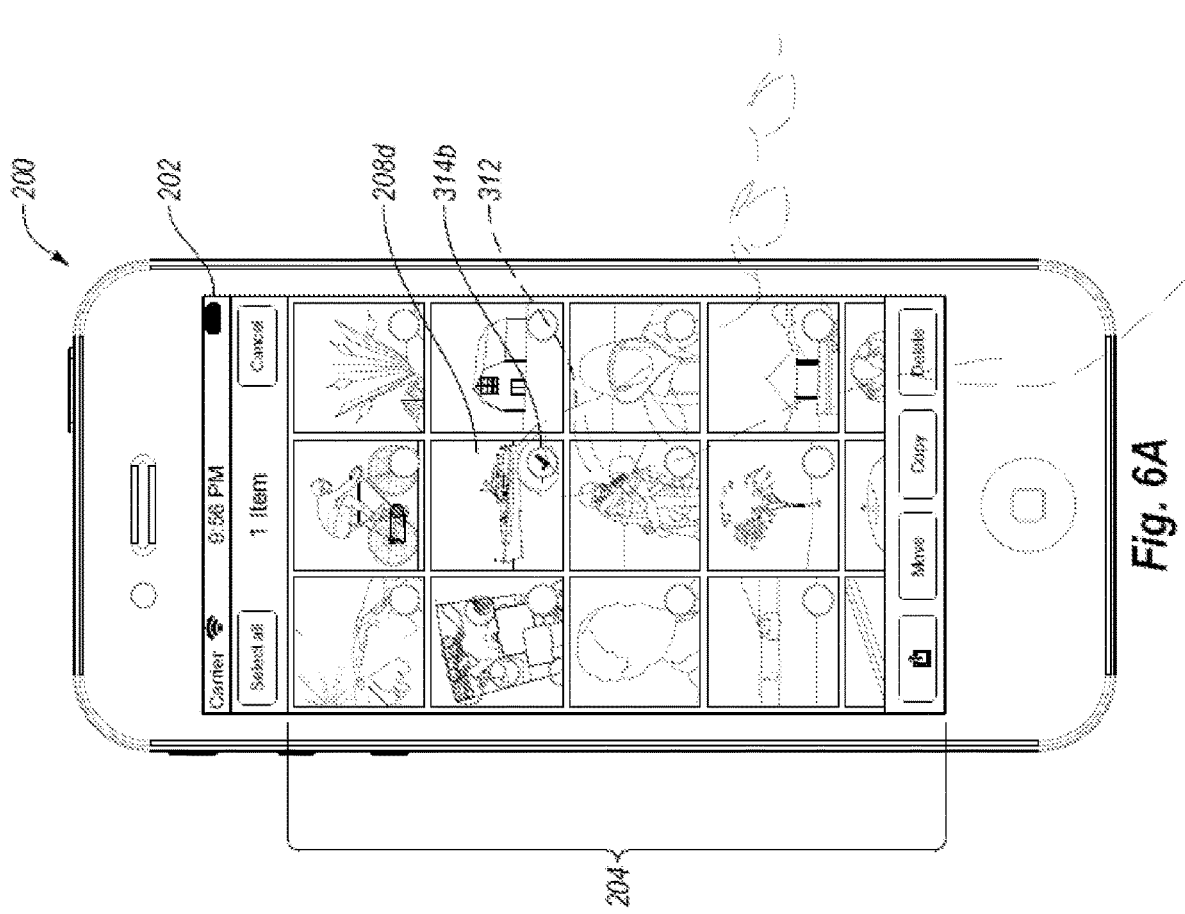

For example, and as shown in FIG. 6A, upon a user tapping content item 208d with a finger 312, content management system 100 can invert (i.e., change) the selection state from unselected to selected, as indicated by second selection indicator 314b (i.e., a checkmark). As shown in FIG. 6B, upon a user performing a swipe gesture 614 across content items 208e, 208d, 208f, content management system 100 can invert (i.e., change) the selection state of each affected content item 208d, 208e, 208f. In particular, content management system 100 can invert a selection state of each of content items 208e, 208f from unselected to selected, as indicated by second selection indicator 314*b* (i.e., a checkmark). On the other hand, content management system 100 can invert a selection state of content item 208*d* selected to unselected, as indicated by first selection indicator 314*a* (i.e., no checkmark).

In one or more alternative embodiments, upon a user performing a swipe gesture across multiple content items, content management system 100 can change the selection state of each affected content item to match the selection state of the first content item affected by the swipe gesture. For example, a swipe gesture starting at a first content item, with a selection state that is selected, may cause the selection state of the other content items affected by the swipe gesture to change to selected. Alternately, a swipe gesture starting at a first content item, with a selection state that is unselected, may cause the selection state of the other content items affected by the swipe gesture to change to unselected.

In still further embodiments, upon a user performing a swipe gesture across multiple content items, content management system 100 can change the selection state of each affected content item to selected. Thus, if content items are previously selected, content management system 100 may leave them selected despite the swipe gesture affecting (i.e., touching) the previously selected content items. On the other hand, the content management system 100 can change the selection state of each affected content item with an unselected state to a selected state.

As mentioned previously, a user may desire to preview or otherwise inspect a content item 208 in order to decide whether they want to select the content item 208. For example, as illustrated in FIGS. 7A and 7B, when a user is presented with a gallery of content items 208 (i.e., thumbnail images), the user may desire to more closely inspect a thumbnail image before selecting it. One or more embodiments can allow a user to inspect or preview a content item 208 without affecting previously selected content items 208. For example, as shown in FIG. 7A, selection graphical user interface 306 can include a subset of content items 208 in a selected state, as indicated by second selection indicators 314*b*.

At this point, the user may desire a closer look at content item 208*a*. Content management system 100 can allow a user to preview content items 208 directly from selection graphical user interface 306. In particular, upon a user performing a predetermined user interaction on a content item 208*a*, content management system 100 can provide a preview of content item 208*a*. For example, upon a user performing a press and hold on content item 208*a*, content management system 100 can provide a preview of the content item 208*a*.

When user's finger 312 touches content item 208*a*, user input detector 104 detects the input as well as the duration of the input. When the duration of the input exceeds a threshold amount of time, user input detector 104 reports a press-and-hold gesture to user interface provider 102. A tap-and hold gesture can cause user interface provider 102 to provide an enlarged view 211 of the affected content item, in this case content item 208*a*. As shown in FIG. 7B, when user interface provider 102 provides an enlarged view 211 of content item 208*a*, the enlarged view can fill view area 204. It is understood that in other embodiments, an enlarged view 211 of a content item may not fill the entire view area 204, but rather may be a different size, such as double the size of a thumbnail image in selection graphical user interface 306. It will also be understood that the enlarged view 211 of a content item is a scaled version of a thumbnail image, or in another embodiment, may be taken from the underlying file indicated by the content item. For example, if the underlying file indicated by a content item is a high resolution photograph, the content item may illustrate a low resolution version of the photograph, while the enlarged view may show the high resolution photograph taken from the underlying file.

As shown in FIG. 7B, user interface provider 106 can provide the enlarged version 211 of content item 208*a* until user input detector 104 detects a release of the press-and-hold gesture. At that point, user interface provider 102 can transition from the enlarged view 211 back to selection graphical user interface 306 as shown in FIG. 7C. It will be noted that display element manager 106 maintains the selection state of all content items 208 throughout the transition from selection graphical user interface 306 to enlarged view 211 back to selection graphical user interface 306. For example, as shown in FIG. 7A various content items 208 are selected, as indicated by selection indicators 314*b*. When, as shown in FIG. 7C, the user's finger 312 releases the press-and-hold gesture, the user interface provider 102 transitions back to selection graphical user interface 306 and the same content items 208 are still displayed by user interface provider 102 as being selected.

In one or more alternate embodiments, the selection state of a content item can change when the user interface provider 102 provides an enlarged version of the content item. For example, when, as shown in FIG. 7C, the user's finger 312 releases the press-and-hold gesture, and the user interface provider 102 transitions back to selection graphical user interface 306, the selection state of content item 208*a* may change to selected (not shown in FIG. 7C), even though the selection state of content item 208*a* was unselected prior to the press-and-hold gesture. In this way, a user can both inspect and select a content item via the same touch gesture.

It will be understood that in other embodiments of the present invention, the user input detector 104 can associate different types of user interactions with a command to enlarge a given content item. For example, user input detector 104 can recognize a user interaction which causes the enlarged view 211 to be provided for a given amount of time. For example, content management system 100 can provide an enlarged view for ten seconds following a double tap of a content item from selection graphical user interface 306. In yet another embodiment, upon user input detector 104 recognizing a spread gesture from a user (i.e., a reverse pinch gesture), content management system 100 can provide the enlarged view 211 of the affected content item 208*a*. Content management system 100 can provide the enlarged view 211 for a predetermined amount of time. Alternatively, a user interaction (such as pinch gesture) can cause content management system 100 to close the enlarged view 211 and return to selection graphical user interface 306.

In one or more embodiments, the user interaction or touch gesture that causes content management system 100 to transition from selection graphical user interface 306 (FIG. 7A) to the enlarged view 211 of content item 208*a* (FIG. 7B) can be different from the user interaction or touch gesture that causes content management system 100 to invert a selection state of a content item 208. For example, a single tap on a content item 208 in a selection graphical user interface 306 can cause content management system 100 to invert a selection state of a content item 298, while a spread or press and hold on the same content item 208*a* can cause content management system 100 to transition to an enlarged view 211 or other preview of content item 208*a*. As such, the user input detector 104 can recognize or distinguish between different user interactions. For example, user input detector 104 can detect a duration of a user interaction to determine if the user interaction is a tap or a press and hold. Along related lines, user input detector 104 can determine a surface area affected (i.e., touched) by a user interaction to distinguish between a single finger tap or double or triple finger tap. In any event, user input detector 104 can detect and identify user interactions and perform an action based on which user interaction or gesture is detected or identified.

Figure 8B:
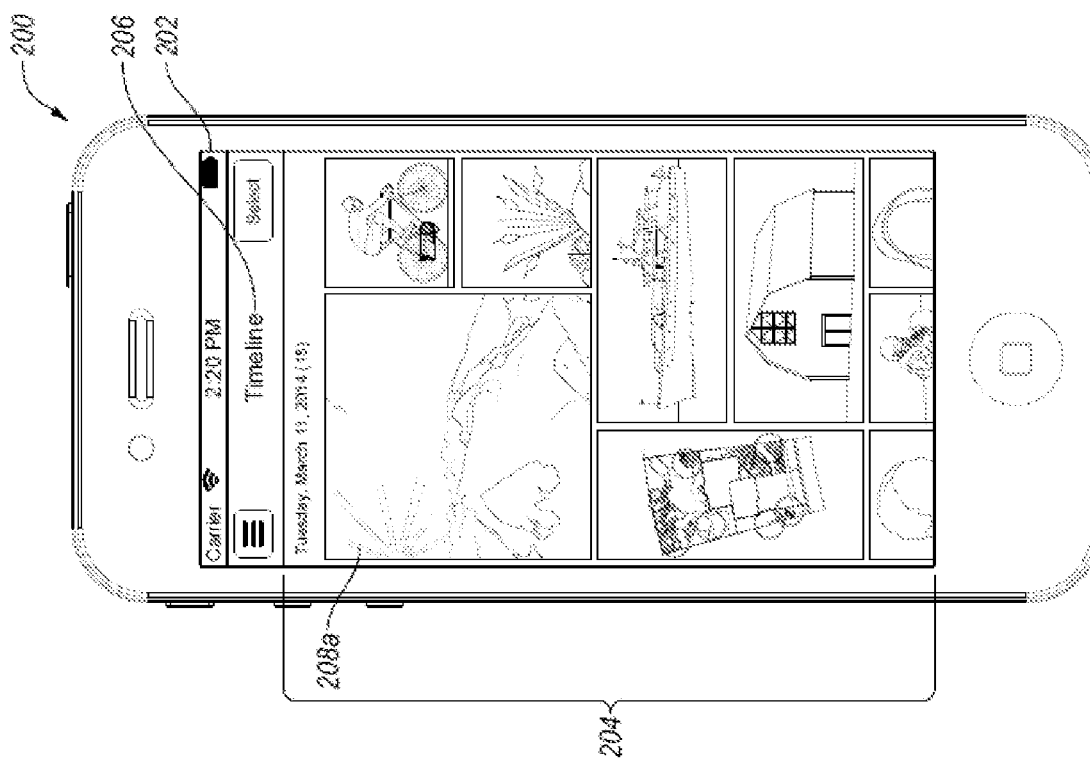
FIG. 8B illustrates a content graphical user interface omitting the display of similar content items in accordance with one or more embodiments.
Figure 8A:
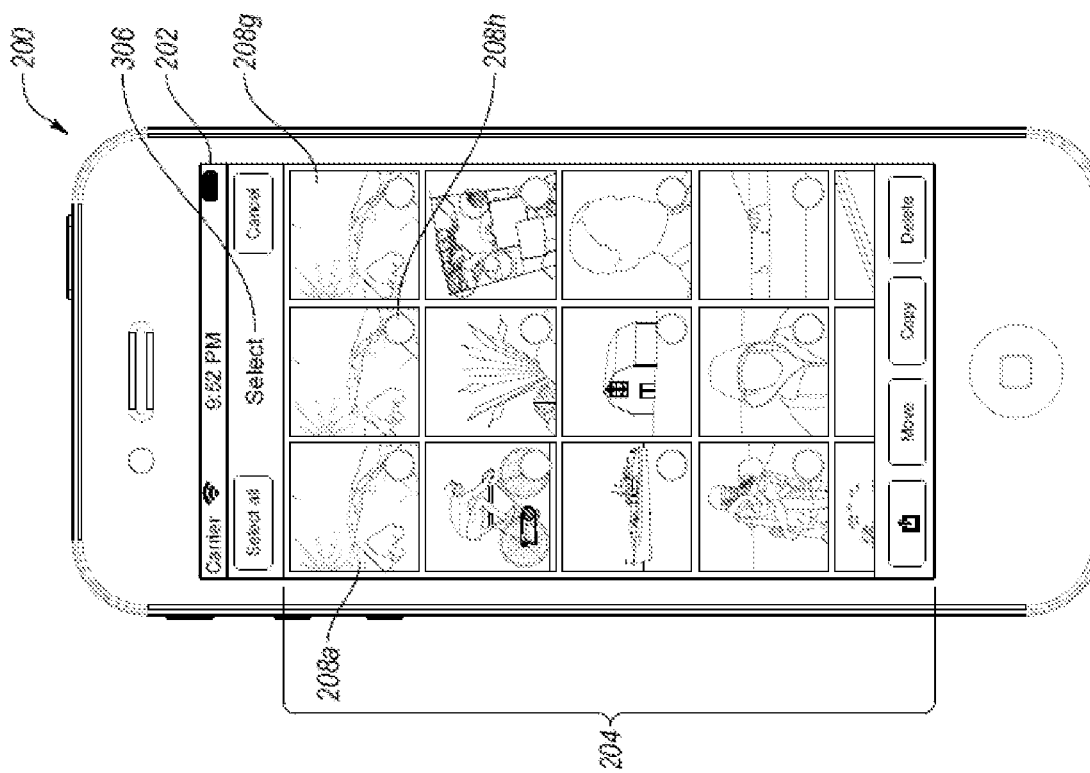
FIG. 8A illustrates a selection graphical user interface displaying similar content items in accordance with one or more embodiments.

Another feature of the content management system 100 is illustrated in FIGS. 8A and 8B. In FIG. 8A, view area 204 of selection graphical user interface 306 displays a gallery of content items 208. The top row of the gallery displays content items 208a, 208g, 208h that are similar or are duplicates. Similar or duplicate files may exist as the result of photographs taken in "burst mode", where multiple photographs are taken in quick succession (e.g., twelve photographs taken per second). User interface provider 102 displays duplicate content items in selection graphical user interface 306 so that a user may inspect and select a single content item that best captures the desired content. For example, in a set of twelve photographs taken of a group of individual in one second, there may be only one photograph out of the twelve where everyone in the group has their eyes open. In timeline graphical user interface 206 (FIG. 8B) or other content graphical user interfaces, however, duplicates do not need to be displayed since individual content items typically are not selected from content graphical user interfaces. Accordingly, and as illustrated in FIG. 8B, when user interface provider 102 provides view area 204 in timeline graphical user interface 206, similar or duplicates content item 208g, 208h are not displayed.

In one or more alternative embodiments, user interface provider 102 may group duplicate content items in a folder displayed as part of the gallery of content items. The user interface provider 102 can indicate the folder using a content item 208 included in the folder and an icon indicating the number of content items in the folder. User input detector 104 may detect a touch gesture (e.g., a press-and-hold touch gesture) affecting the folder. In a particular embodiment, when user input detector 104 reports the touch gesture to user interface provider 102, user interface provider 102 may display an exploded view of the folder. In other words, the user interface provider 102 can expand or open the folder and display can display each of the content items in the folder. Additionally, when user input detector 104 detects a long touch, a pinch in, or other predetermined touch gesture, the user interface provider 102 can collapse the expanded or exploded view of the folder.

In yet another alternative embodiment, user interface provider 102 may group content items in a folder based on other criteria. For example, user interface provider 102 may group content items in a folder based on the content items being created on the same date. In particular, user interface provider 102 may group photographs that were taken on the same date into a folder. Alternately, user interface provider 102 may group photographs based on whether the photographs were taken at the same geographic location, taken by the same person, taken featuring the same person/people, taken featuring the same landmark, or any other criteria suitable for grouping photographs.

Figure 9B:
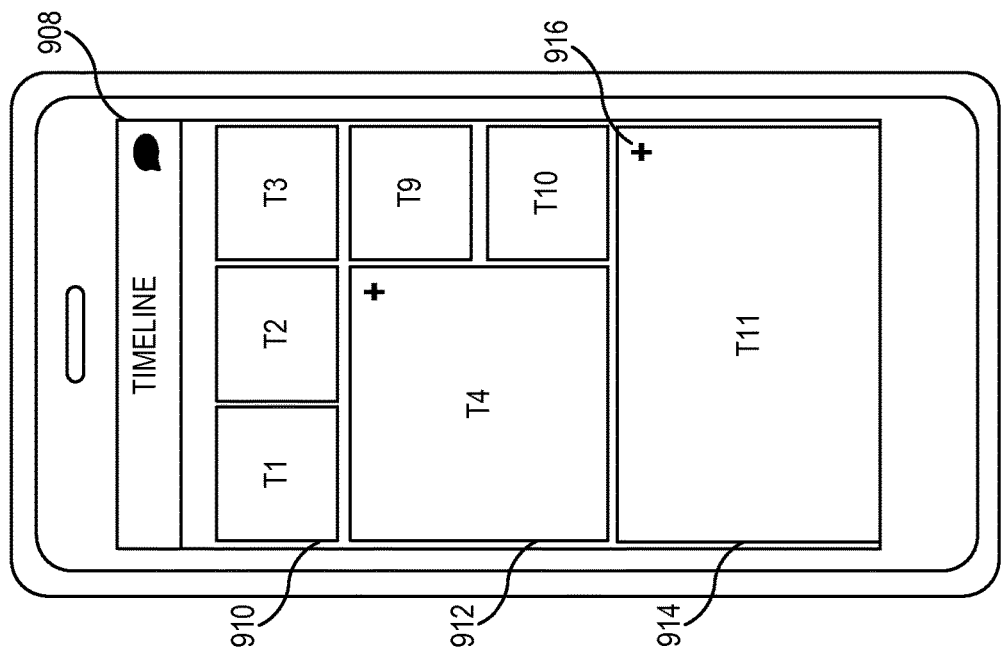
FIGS. 9A-9D illustrate graphical user interfaces for collapsing views of content items and for managing the collapsed views, in accordance with embodiments of the present invention.
Figure 9A:
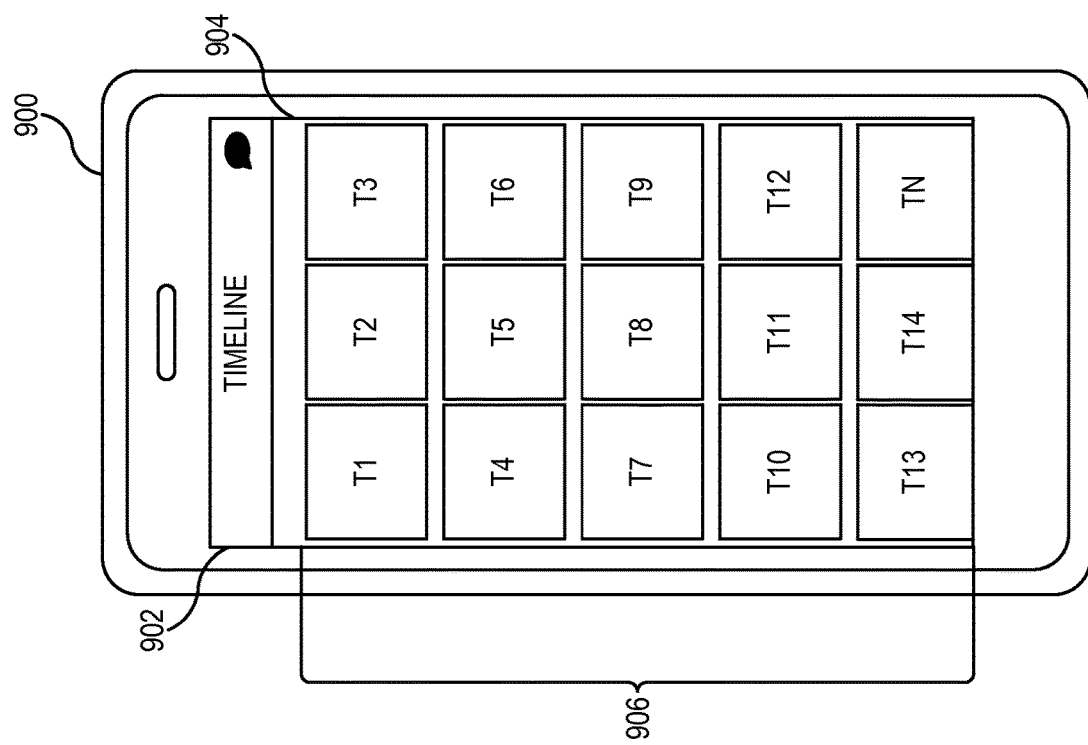

FIGS. 9A-9D illustrate graphical user interfaces for collapsing views of content items and for managing the collapsed views, in accordance with embodiments of the present invention. As shown in FIG. 9A, a computing device 900 can display images (e.g., images T1-TN) or other content items stored in content management service 200 in a timeline view 902 on touchscreen 904. Images 906 can be arranged according to timestamp metadata associated with each image. In some embodiments, timeline view 902 can display all content items associated with a user's account, regardless of how the content items are organized within the account. For example, as described above, content items can be organized into a number of folders, and multiple copies of the same content item can be stored in multiple folders. As a result, when viewed in timeline view 902, the multiple copies of the image are displayed sequentially within images 906.

Timeline view 902 is one example of an aggregate view in which all, or a subset of, content items are displayed together. In some embodiments, an aggregate view can display representations of the content items sorted based on a characteristic shared by the content items, such as time, location, event name, or other characteristic. Although embodiments are described herein with respect to a timeline view, embodiments of the present invention can be equally applied to any other aggregate view.

Interface 908 shows a collapsed view of images 906. As described above, content management system 100 can identify duplicate and near-duplicate content items and can cause client device 900 to display a collapsed view 908 of images 906. For example, as described above, the metadata associated with collapsed content items can indicate that the content items are to be hidden, and can include an identifier of a representative image associated with the collapsed image. As shown in FIG. 9B, images T1-T3 910 are not collapsed, indicating that these images are not duplicates and/or do not have characteristics that are similar within a threshold to each other to qualify as near-duplicates. Images T4-T8 have been collapsed into a larger version of T4 912 and images T11-TN have also been collapsed into a larger version of T11 914. As such, images T5-T8 can each be associated with metadata indicating the content items are collapsed and an identifier pointing to image T4. In some embodiments, collapsed indicator 916 can be added to representative images that are associated with multiple images or content items, to indicate to the user that the image represents multiple content items.

Figure 9D:
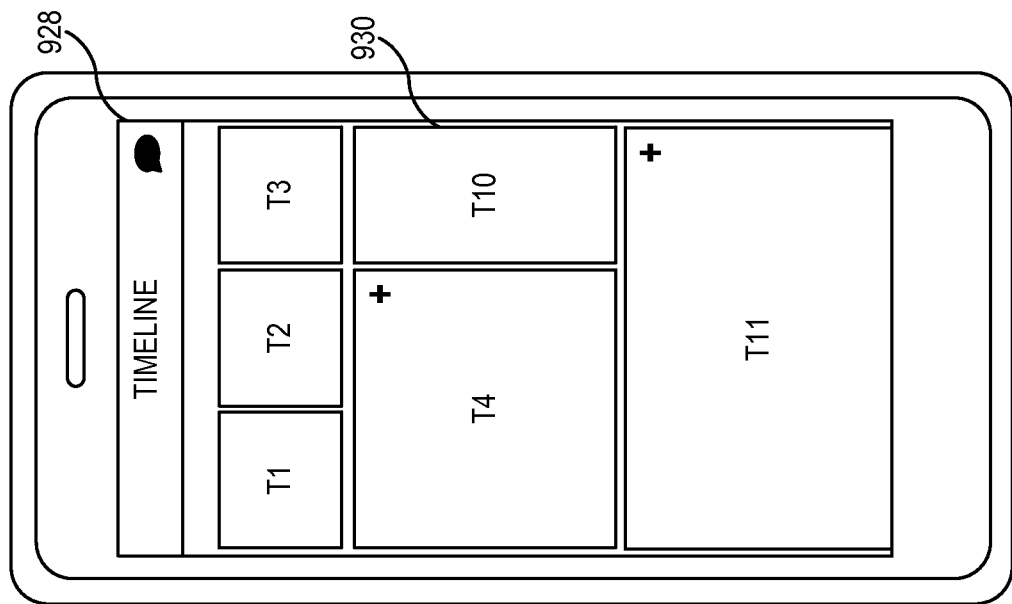
Figure 9C:
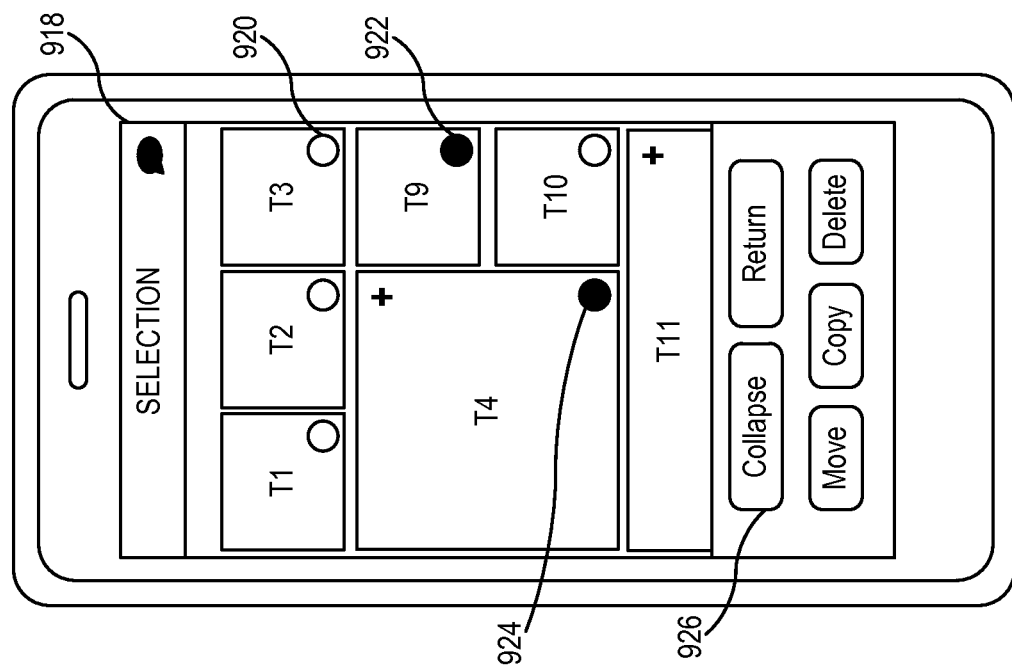

In some embodiments, images, or other content items, can be manually grouped by a user in addition, or as an alternative, to the automatic grouping described above. As shown in FIG. 9C, based on a gesture input detected by client device 900, a selection view 918 can be displayed. Each content item can include a selection indicator, such as selection indicators 920, 922, and 924. The user can select multiple content items, for example T4 and T9 (as indicated by filled selection indicators 922 and 924), and select collapse action 926. As shown in FIG. 9D, after selecting collapse action 926, client device can display updated collapse view 928. In updated collapse view 928, T9 has been grouped with T4 and is no longer displayed. Instead, T10 930 has been resized and is displayed in place of T9. In some embodiments, a gesture-based input, such as a drag and drop gesture, can be used to manually group content items from timeline view 902. In some embodiments, the gesture-based input can be provided from timeline view 902, without first entering a selection view. In some embodiments, content items that represent multiple collapsed content items can be represented differently in timeline view 902. In some embodiments, an indicator can be added to the content item indicating that it represents multiple collapsed content items, or other visual changes can be made to the content item, such as adding a three dimensional aspect to the content item such that the content item appears to represent a stack or deck of content items.

In some embodiments, actions can be performed on images shown in timeline view 902. For example, a user can select an image from timeline view 902 and then select an action to be performed on the image. However, in embodiments where groups of images have been collapsed, identifying the particular image to be acted upon becomes more difficult. As described below with reference to FIGS. 10A-10C, embodiments of the present invention can provide a detail view when a representative image is selected, which can display each image that is represented.

Figure 10B:
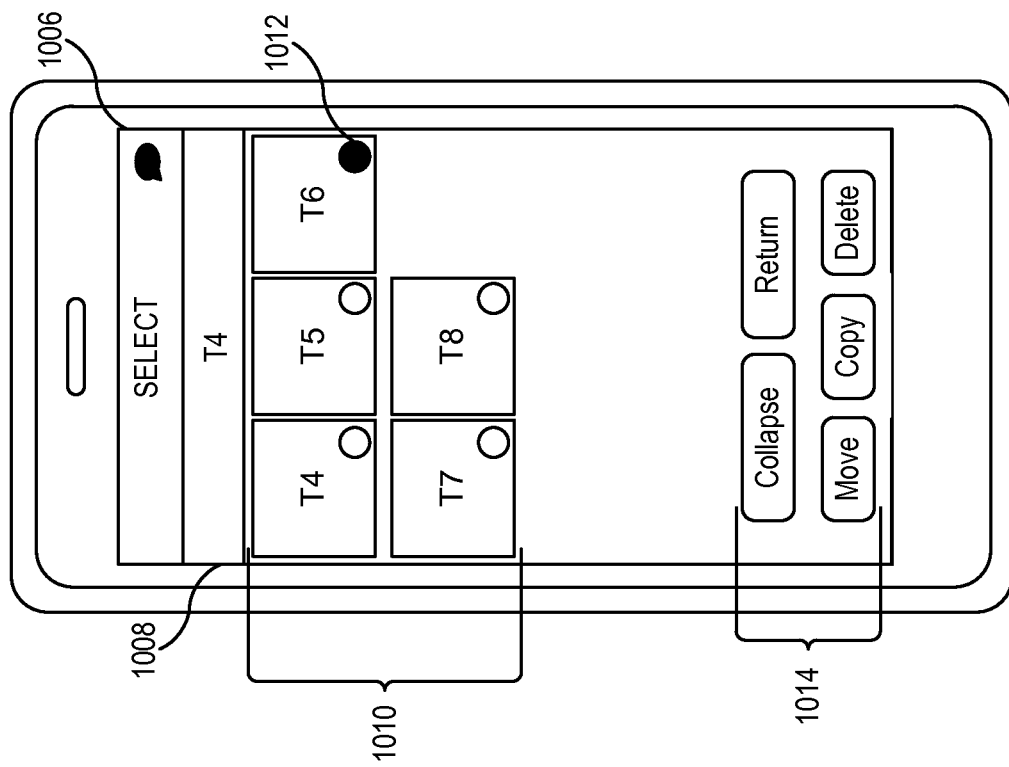
FIGS. 10A-10C illustrate graphical user interfaces for viewing and editing collapsed views of content items, in accordance with embodiments of the present invention.
Figure 10A:
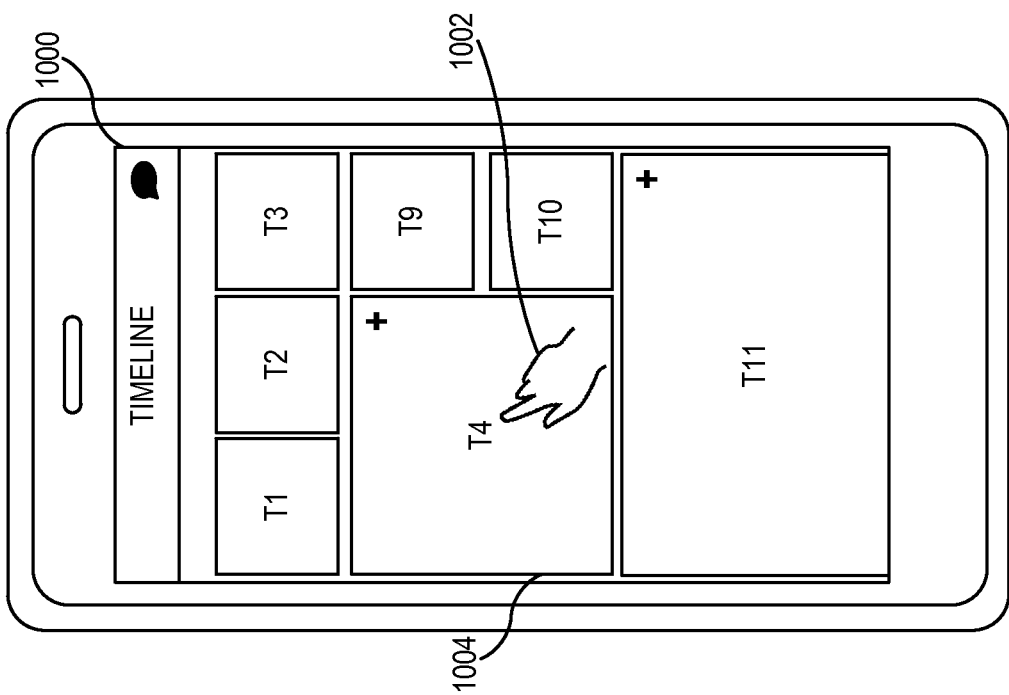
Figure 10C:
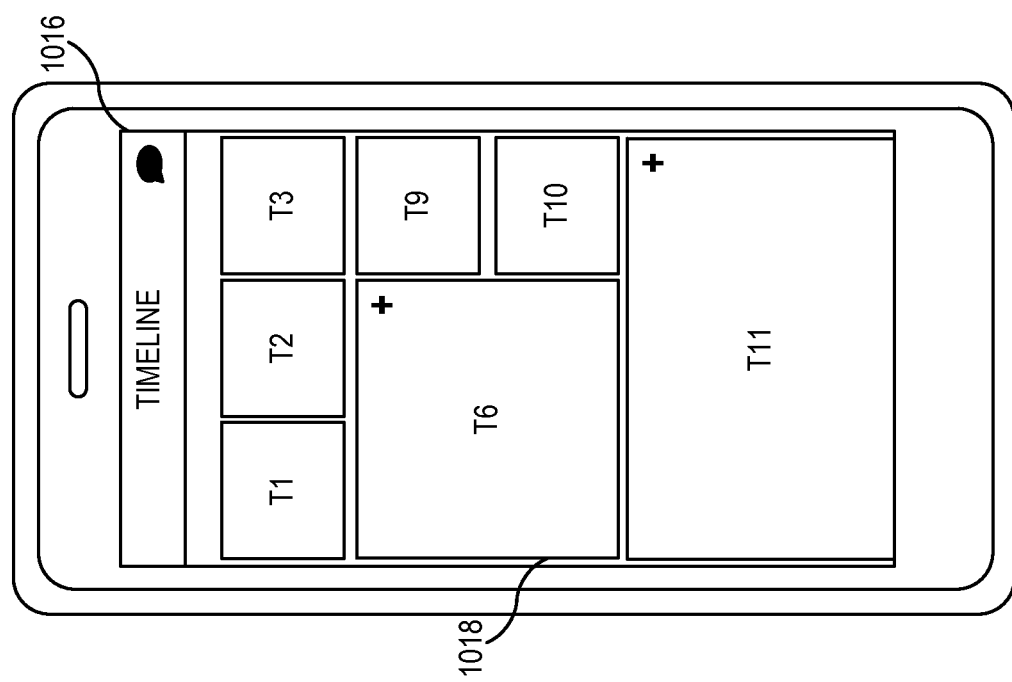

FIGS. 10A-10C illustrate graphical user interfaces for viewing and editing collapsed views of content items, in accordance with embodiments of the present invention. In some embodiments, when images, or other content items, are collapsed, content management system 100 can automatically select a representative image to serve as the representative image. For example, content management system 100 can automatically select a first image, such as an image with the earliest timestamp, or can automatically select a random image. In some embodiments, a control interface can be provided to allow users to update the representative image. As shown in FIG. 10A, a client device can display a collapsed view 1000 of content items stored in content management service 200. The user can select 1002 (e.g., tap, click, or otherwise interact with) a representative image 1004 to view a control view 1006.

As shown in FIG. 10B, control view 1006, can include detail view 1008 indicating which representative image 1004 was selected and displaying collapsed images 1010 associated with representative image 1004. In some embodiments, each collapsed image 1010 can include selection indicator 1012. When one of the collapsed images 1010 is selected, selection indicator 1012 can be displayed to indicate that selection. For example, selection indicator 1012 is filled, indicating image T6 is selected, while the selection indicators associated with images T4, T5, T7, and T8 are not filled, indicating that these images are not selected. Actions 1014 can be performed on the selected images. For example, the user can select an alternative representative image to display in collapsed view 1000 from collapsed images 1010. After selecting T6, as indicated by indicator 1012, the user can select "collapse" 1014. As shown in FIG. 10C, after selecting "collapse" 1014, the view displayed by the client device can be returned to collapsed view 1016. In collapsed view 1016, the representative image 1018 has been updated from T4 to T6.

In some embodiments, alternative views of collapsed images can also be provided. For example, when input detector 104 detects a gesture from the user selecting an image, an edit view can be displayed. In some embodiments, when a change is made to a representative image (e.g., adding or changing tags, updating timestamp data, or adding/changing other metadata associated with the representative image) the change can be propagated to each image that has been collapsed. For example, if the user's camera assigned the wrong timestamp to a series of images, the user can update the timestamp on one image and have similar updates applied to each duplicate or near-duplicate image.

As described above, although specific views have been described alternative views and implementations may also be possible. For example, in some embodiments, when input detector 104 detects a tap-and-hold gesture on a representative image, an interactive overlay showing the collapsed images can be displayed. The user can then navigate the collapsed images by, e.g., swiping left and right to select an image. Once selected, image details (e.g., file name, timestamp, path, etc.) can be displayed. In some embodiments, once selected a list of actions can be displayed and the user can select an action to be performed on the image.

FIGS. 1-10, the corresponding text, and the examples, provide a number of different systems and devices for interacting with content items via a graphical user interface. In addition to the foregoing, embodiments of the present invention can also be described in terms of flowcharts comprising acts and steps in a method for accomplishing a particular result. For example, FIGS. 11-15 illustrate flowcharts of exemplary methods in accordance with one or more embodiments of the present invention. The methods described in relation to FIGS. 11-15 may be performed with less or more steps/acts or the steps/acts may be performed in differing orders. Additionally, the steps/acts described herein may be repeated or performed in parallel with one another or in parallel with different instances of the same or similar steps/acts.

Figure 11:
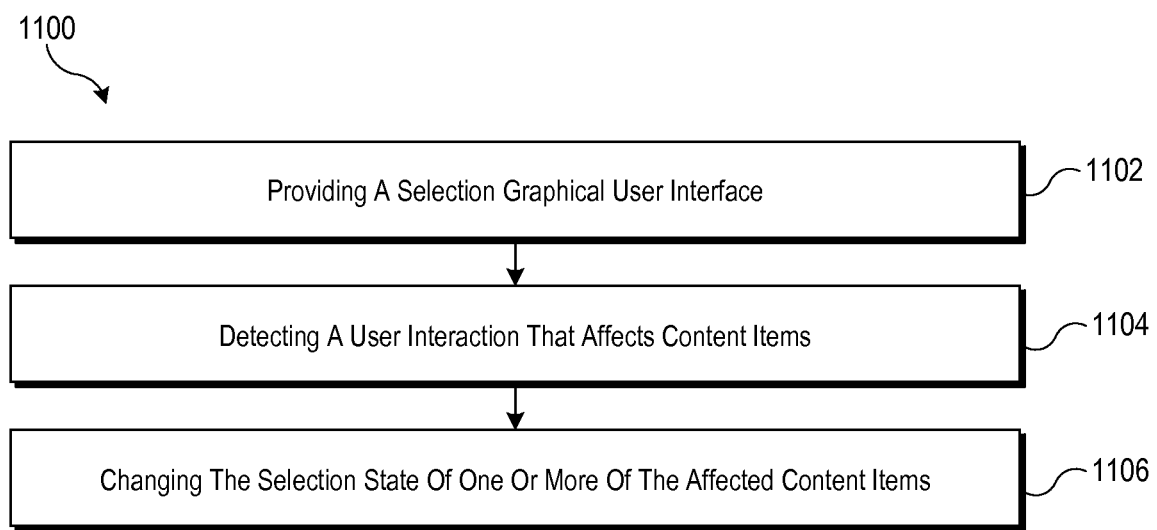
FIG. 11 illustrates a flowchart of a series of acts in a method of selecting multiple content items with a single user action or gesture in accordance with one or more embodiments.

FIG. 11 illustrates a flowchart of one example method 1100 of selecting multiple content items via a single user interaction or touch gesture. The method 1100 includes an act 1102 of providing a selection graphical user interface. In particular, act 1102 can involve providing a selection graphical user interface 306 comprising content items 208. For example, act 1102 can involve providing a plurality of thumbnail images. Content items 208 in the selection graphical user interface 306 are selectable and each include a selection state that is either selected or unselected. Act 1102 can further involve indicating each selectable content item with an associated selection indicator 314a, 314b indicating whether the associated content item is selected or not.

Method 1100 further includes an act 1104 of detecting a user interaction that affects content items. In particular, act 1104 can include detecting, by at least one processor, a user interaction 514, 614 within the selection graphical user interface 306 that affects a plurality of content items 208a-208c, 208d-208f. For example, act 1104 can involve detecting a touch gesture 514, 614 on a touch screen 202 displaying the selection graphical user interface 306. For example, act 1104 can involve detecting a swipe gesture 514, 614 that touches more than one content item 208a-208c, 208d-208f. Detecting a swipe gesture 514, 614 can involve detecting a horizontal swipe, a vertical swipe, a diagonal swipe, or a swipe that combines horizontal, vertical, and/or diagonal movements.

In addition, method 1100 further includes an act 1106 of changing the selection state of the one or more of the affected content items. In particular, act 1106 can include inverting the selection state of each of the plurality of content items 208a-208c, 208d-208f affected by the detected user interaction 514, 614. For example, act 1106 can involve inverting a selection state from unselected to selected or from selected to unselected.

Alternatively, act 1106 can involve causing the selection state of each of the plurality of content items 208a-208c, 208d-208f affected by the detected user interaction 514, 614 to match a selection state of a first content item affected by the detected user interaction 514, 614. Still further act 1106 can involve causing the selection state of each of the plurality of content items 208a-208c, 208d-208f affected by the detected user interaction 514, 614 to a select state. Thus, act 1106 can involve changing the selection state of unselected content items affected by the detected user interaction 514, 614 to a selected state. Similarly, act 1106 can involve maintaining the selection state of selected content items affected by the detected user interaction 514, 614 as selected.

Act 1106 can further involve updating the selection indicator 314a, 314b of each of the plurality of content items 208a-208c, 208d-208f affected by the detected user interaction 514, 614 as the selection state of each of the plurality of content items 208a-208c, 208d-208f is inverted. In other words, if the selection state of the affected content item is being inverted to a selected state, act 1106 can involve adding a checkmark 314b to a content item 208. If the selection state of the affected content item is being inverted to an unselected state, act 1106 can involve removing a checkmark 314b from a content item 208.

Figure 12:
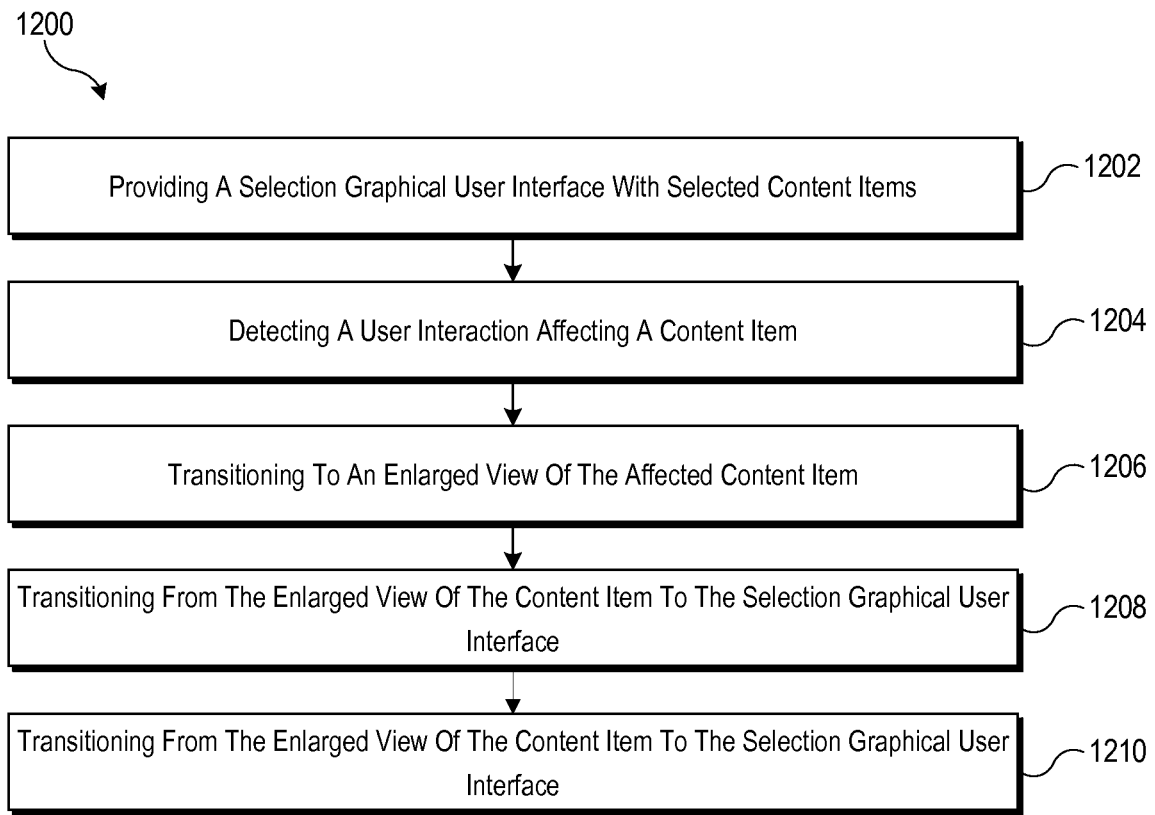
FIG. 12 illustrates a flowchart of a series of acts in a method of transitioning between a selection graphical user interface and an enlarged view of a content item in accordance with one or more embodiments.

FIG. 12 illustrates a flowchart of a method 1200 of maintaining selection states of content items during transitions between view or user interfaces. As shown, method 1200 can include an act 1202 of providing a selection graphical user interface with selected content items. In particular, the act 1202 can include providing a selection graphical user interface 306 comprising a plurality of content items 208, wherein one or more content items 208 of the plurality of content items is in a selected state. Content items 208 can be selectable or unselectable by a first type of user interaction. For example, act 1202 can involve providing a plurality of thumbnail images in a view area 204 of a touch screen 202 of a computing device 200.

Act 1202 can involve detecting a first type of user interaction on a content item(s) 208, such as a tap or swipe received via a touch screen. Act 1202 can also involve updating a selection state of the content item(s) 208 affected by the tap or swipe. Act 1202 can additionally involve updating a selection indicator 314a, 314b of the content item(s) 208 affected by the tap or swipe. In particular, act 1202 can involve changing the content item(s) 208 affected by the tap or swipe from an un-selected state to a selected state in response to detecting the first type of user interaction with the content item(s).

The method 1200 can also include an act 1204 of detecting a user interaction affecting a content item. In particular, the act 1204 can include detecting, by at least one processor, a second type of user interaction with a content item 208a of the plurality of content items 208. For example, act 1204 can involve detecting a press-and-hold on content item 208a. Act 1204 can also involve detecting a duration of the press and hold.

The method 1200 can also include an act 1206 of transitioning to an enlarged view 211 of the affected content item 208a. In particular, the act 1206 can include transitioning from the selection graphical user interface 306 to an enlarged view 211 of the content item 208a upon detecting the second type of user interaction with the content item 208a. For example, act 1206 can involve maintaining the enlarged view 211 of the content item 208a during the duration of the press and hold. Alternatively, act 1206 can involve presenting an enlarged view 211 of the affected content item 208a upon detecting a spread gesture applied to the content item 208a.

The method 1200 can also include an act 1208 of transitioning from the enlarged view 211 of the content item 208a to the selection graphical user interface 306. For example, act 1208 can involve transitioning from the enlarged view 211 of the content item 208a to the selection graphical user interface 306 upon the duration of the press and hold ending.

The method 1200 can also include an act 1210 of maintaining the selected content items within the selection graphical user interface. In particular, act 1210 can include maintaining the one or more content items in the selected state during transitioning between the selection graphical user interface 306 and the enlarged view 211 of the content item 208a. For example, act 1210 can involve displaying a selection indicator 314b in connection which each content item 208 that was in a selected state prior to transitioning from the selection graphical user interface 306 to enlarged view 211 of the content item 208a.

Figure 13:
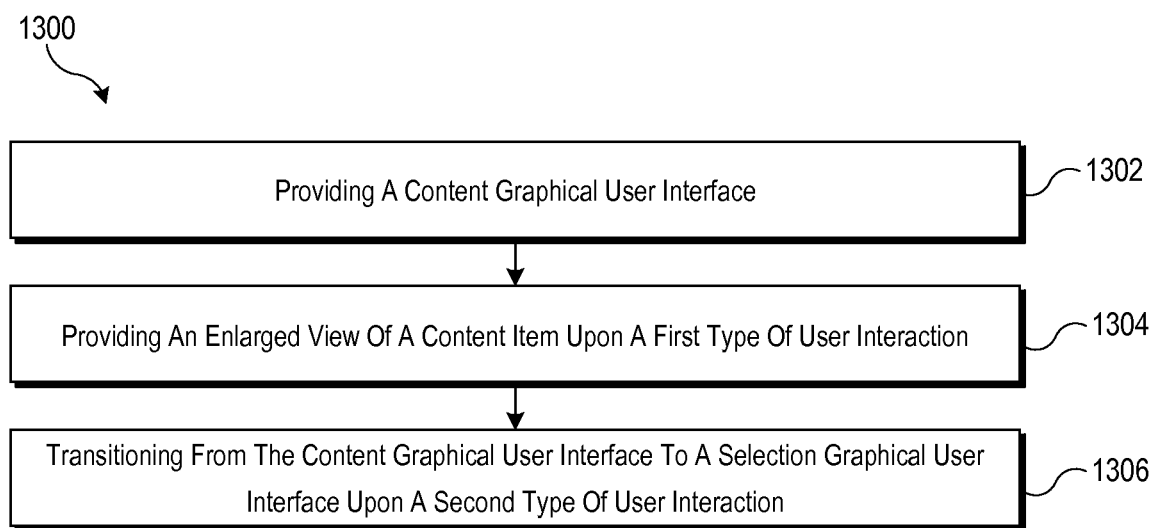
FIG. 13 illustrates a flowchart of a series of acts in a method of enlarging a content item in accordance with one or more embodiments.

FIG. 13 illustrates a flowchart of another example method 1300 of providing a preview of a content item or a selection user interface based on user interactions with a content item. As shown, method 1300 can include an act 1302 of providing a content graphical user interface 206, 406. In particular, act 1302 may include providing a content graphical user interface 206, 406 comprising a plurality of content items 208, such as thumbnail images.

The method 1300 can also include an act 1304 of providing an enlarged view 211 of a content item 208a upon a first type of user interaction. In particular, act 1304 can include providing an enlarged view 211 of a content item 208a of the plurality of content items upon detecting, by at least one processor, a first user interaction with the content item 208a. For example, act 1304 can involve detecting a tap or spread on a content item 208a received via a touch screen and presenting an enlarged view 211 of the content item 208a affected by the tap or spread.

The method 1300 can also include an act 1306 of transitioning from the content graphical user interface to a selection graphical user interface upon a second type of user interaction. In particular, act 1306 can include transitioning from the content graphical user interface 206, 406 to a selection graphical user interface 306 upon detecting, by the at least one processor, a second type of user interaction with the content item 208a. When in the selection user interface 306, content items are selectable or un-selectable by one or more user interactions in the selection graphical user interface. For example, act 1306 can involve detecting a press-and-hold gesture received via a touch screen 202. Upon detecting a press-and-hold gesture, act 1006 can involve transitioning from a content user interface 206, 406 in which content items 208 are not selectable to a selection user interface 306 in which content items 208 are selectable. Act 1306 can further involve providing a pulse animation during the transition from the content graphical user interface 206, 406 to the selection graphical user interface 306.

Figure 14:
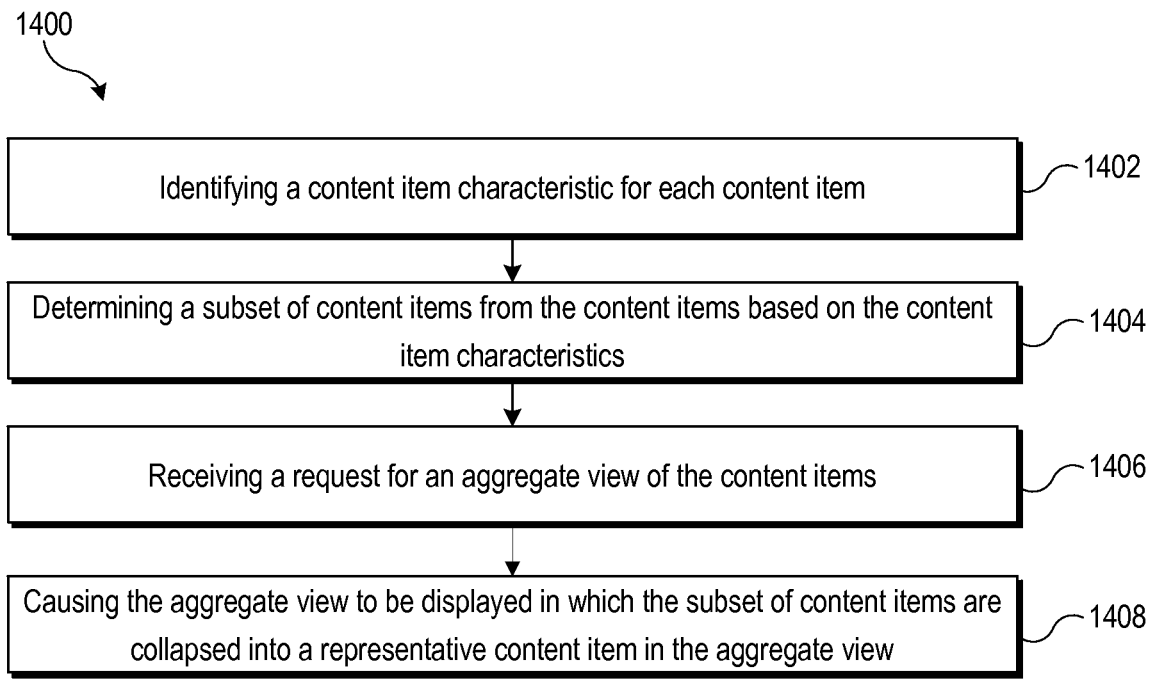
FIG. 14 illustrates a flowchart of a method of collapsing content items in accordance with one or more embodiments.

FIG. 14 illustrates a flowchart of a method 1400 of collapsing content items in accordance with one or more embodiments. At step 1402, an online content management service can identify an image characteristic for each image, or other content item, stored in the online content management service and associated with a user's account. As described above, in some embodiments, the online content management service can include image analysis module 106A, which analyzes each image to identify one or more image characteristics that can be used to identify duplicate and/or near-duplicate content items.

At step 1404, the online management service can determine a subset of images based on the image characteristics. For example, a duplicate identification module 106B can compare the differences between image characteristics identified by image analysis module 106A with static or dynamic threshold data. If the differences between image characteristics are less than the thresholds, the corresponding images can be grouped as a subset.

At step 1406, the online management service can receive a request to display an aggregate view of the images. In some embodiments, the aggregate view can be a timeline view in which images are displayed in an order based on a time associated with each image (such as an upload time, capture time, or other temporal value). The aggregate view can display each image associated with the account sorted by timestamp data associated with each image. At step 1408, the online management service can cause the aggregate view to be displayed on a client device. To improve navigability of the aggregate view, each image included in the subset of images can be collapsed, such that a single representative image is displayed for the subset of images. In some embodiments, in response to the request to display the aggregate view, the collapsed aggregate view can be provided automatically. In some embodiments, a user can separately request the collapsed aggregate view, enabling the user to switch views between the aggregate view and the collapsed aggregate view.

As described above, in some embodiments, identifying an image characteristic for each image can include computing a content hash for each of the plurality of images. The content hashes computed for each image can be compared with other images in a user's account to identify images with identical content hashes. Each image with an identical content hash can then be indicated as being members of a subset of collapsed images. In addition to content hashes, timestamp information can be compared between images to determine images taken in rapid succession (e.g., burst mode). For example, a timestamp for a number of temporally consecutive images can be identified and a difference between the timestamps can be calculated. If the difference between time stamps is determined to be less than a threshold value, the images can be indicated as duplicates or near-duplicates and collapsed. Other content characteristics, such as the locations of edges, number of pixels having a particular color value, locations of color clusters within an image, and other characteristics can also be compared.

Figure 15:
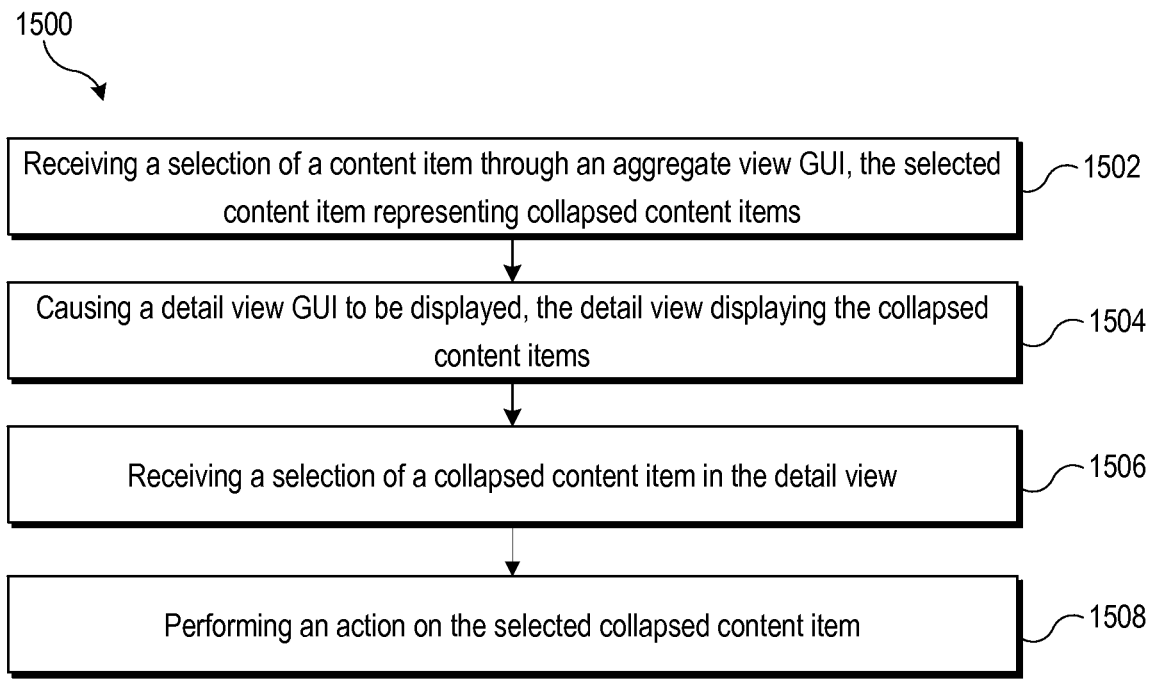
FIG. 15 illustrates a flowchart of a method of managing a collapsed view of content items in accordance with one or more embodiments.

FIG. 15 illustrates a flowchart of a method 1500 of managing a collapsed view of content items in accordance with one or more embodiments. At step 1502 an online content management service can receive a selection of an image through a graphical user interface. The image can be a representative image that corresponds to multiple duplicate and/or near-duplicate images. As described above, the selection can be received through a touchscreen interface as a detected gesture (e.g., a tap, swipe, or other gesture) on a client device that is sent to the online content management service. In some embodiments, the selection can be received using other user input devices.

At step 1504, in response to the selection of the image, the online content management service can cause a detail view graphical user interface to be displayed on the client device. The detail view can include a graphical representation (e.g., an icon, thumbnail, etc.) of each collapsed image associated with the representative image. In some embodiments, the representative image can be based on one of the collapsed images associated with the representative image.

At step 1506, the online content management service can receive a selection of one or more of the collapsed images. In some embodiments, the selection can include an action to be performed on the collapsed image. For example, the action can be to set the representative image to be the selected collapsed image. In some embodiments, the action can be to move the image to a different folder within the online content management service. In some embodiments, the action can be to edit the image, such as cropping, filtering, or other image processing actions. In some embodiments, the action can be to remove the collapsed image's association with the representative image (e.g., to make it so that the image is no longer collapsed when viewed in timeline view). At step 1508, the action can be performed on the selected collapsed image.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general purpose computer to turn the general purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 16:
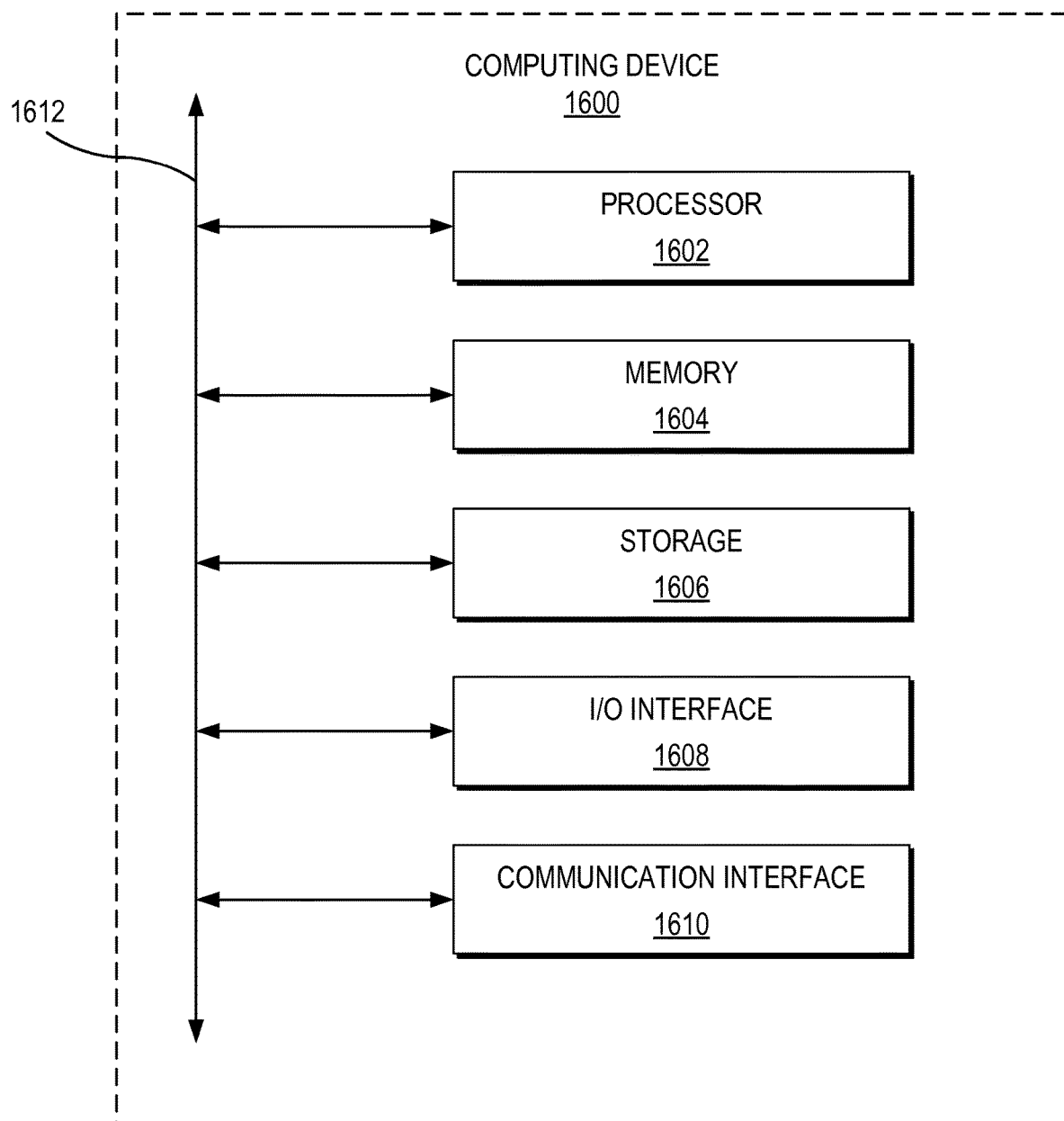
FIG. 16 illustrates a block diagram of an exemplary computing device in accordance with one or more embodiments.

FIG. 16 illustrates a block diagram of exemplary computing device 1600 that may be configured to perform one or more of the processes described above. One will appreciate that user interface system 100 may be implemented by one or more computing devices such as computing device 1600. As shown by FIG. 16, computing device 1600 can comprise processor 1602, memory 1604, storage device 1606, I/O interface 1608, and communication interface 1610, which may be communicatively coupled by way of communication infrastructure 1612. While an exemplary computing device 1600 is shown in FIG. 16, the components illustrated in FIG. 16 are not intended to be limiting. Additional or alternative components may be used in other embodiments. Furthermore, in certain embodiments, computing device 1600 can include fewer components than those shown in FIG. 16. Components of computing device 1600 shown in FIG. 16 will now be described in additional detail.

In particular embodiments, processor 1602 includes hardware for executing instructions, such as those making up a computer program. As an example and not by way of limitation, to execute instructions, processor 1602 may retrieve (or fetch) the instructions from an internal register, an internal cache, memory 1604, or storage device 1606 and decode and execute them. In particular embodiments, processor 1602 may include one or more internal caches for data, instructions, or addresses. As an example and not by way of limitation, processor 1602 may include one or more instruction caches, one or more data caches, and one or more translation lookaside buffers (TLBs). Instructions in the instruction caches may be copies of instructions in memory 1604 or storage 1606.

Memory 1604 may be used for storing data, metadata, and programs for execution by the processor(s). Memory 1604 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 1604 may be internal or distributed memory.

Storage device 1606 includes storage for storing data or instructions. As an example and not by way of limitation, storage device 1606 can comprise a non-transitory storage medium described above. Storage device 1606 may include a hard disk drive (HDD), a floppy disk drive, flash memory, an optical disc, a magneto-optical disc, magnetic tape, or a Universal Serial Bus (USB) drive or a combination of two or more of these. Storage device 1606 may include removable or non-removable (or fixed) media, where appropriate. Storage device 1606 may be internal or external to computing device 1600. In particular embodiments, storage device 1606 is non-volatile, solid-state memory. In other embodiments, Storage device 1606 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

I/O interface 1608 allows a user to provide input to, receive output from, and otherwise transfer data to and receive data from computing device 1600. I/O interface 1608 may include a mouse, a keypad or a keyboard, a touch screen, a camera, an optical scanner, network interface, modem, other known I/O devices or a combination of such I/O interfaces. I/O interface 1608 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interface 1608 is configured to provide graphical data to a display for presentation to a user. The graphical data may be representative of one or more graphical user interfaces and/or any other graphical content as may serve a particular implementation.

Communication interface 1610 can include hardware, software, or both. In any event, communication interface 1610 can provide one or more interfaces for communication (such as, for example, packet-based communication)

between computing device 1600 and one or more other computing devices or networks. As an example and not by way of limitation, communication interface 1610 may include a network interface controller (NIC) or network adapter for communicating with an Ethernet or other wire-based network or a wireless NIC (WNIC) or wireless adapter for communicating with a wireless network, such as a WI-FI.

Additionally or alternatively, communication interface 1610 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communication interface 1610 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, communication interface 1610 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

Communication infrastructure 1612 may include hardware, software, or both that couples components of computing device 1600 to each other. As an example and not by way of limitation, communication infrastructure 1612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Figure 17:
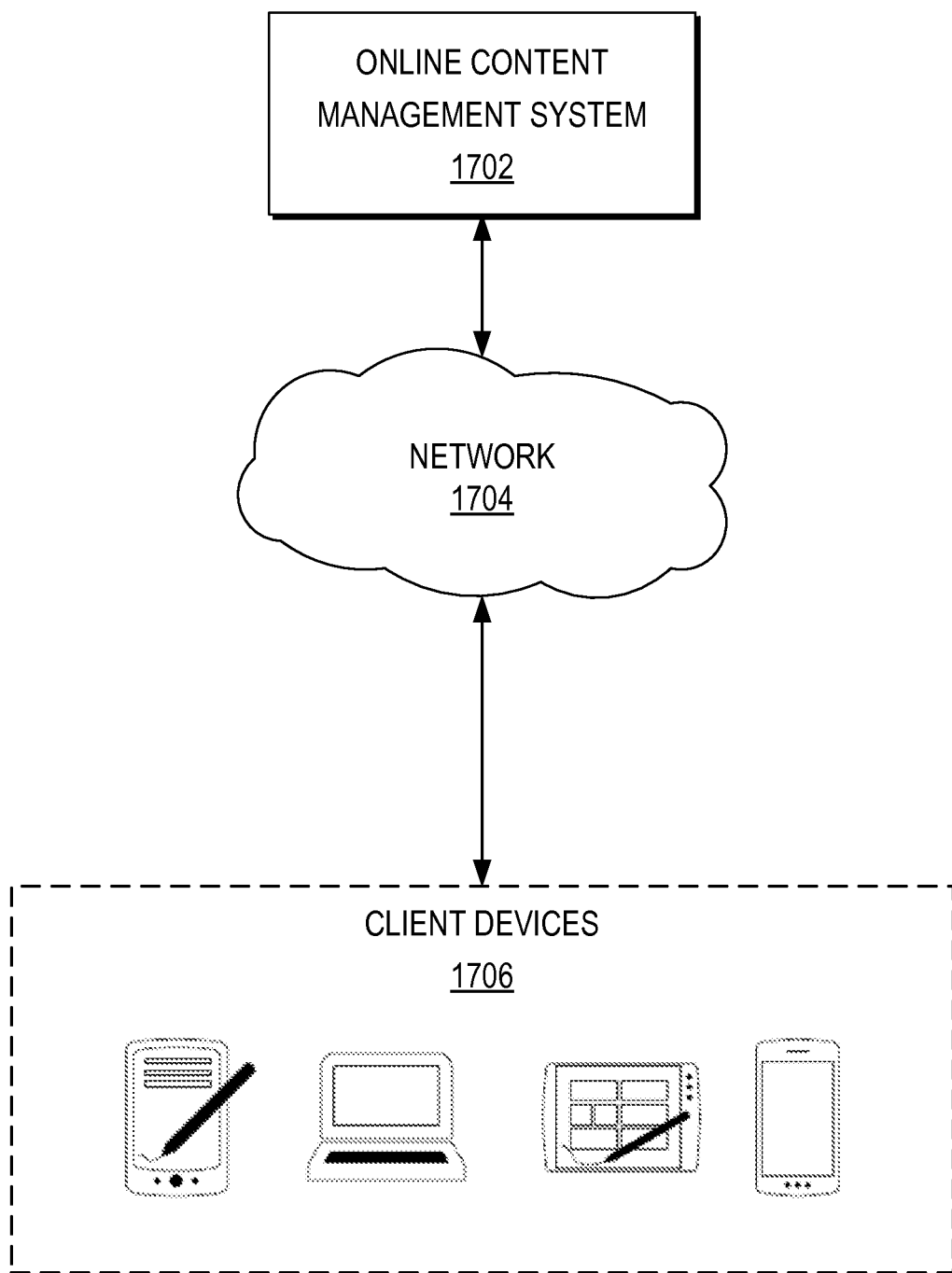
FIG. 17 illustrates a network environment of an online content management system in accordance with one or more embodiments.

FIG. 17 is a schematic diagram illustrating an online content management system 1702 that can work in conjunction with content management system 100. Online content management system 1702 may generate, store, manage, receive, and send digital content items. For example, online content management system 1702 may send and receive content items 208 to and from client devices 1706 by way of network 1704. In particular, online content management system 302 can store and manage a collection of content items. Online content management system 1702 can manage the sharing of content items between computing devices associated with a plurality of users. For instance, online content management system 1702 can facilitate a user sharing a content item with another user of the content management system 100.

In particular, online content management system 1702 can manage synchronizing content items across multiple client devices 1706 associated with one or more users. For example, user may edit a content item using client devices 1706. The online content management system 1702 can cause client device 1706 to send the edited content item to online content management system 1702. Online content management system 1702 then synchronizes the edited content item on one or more additional computing devices.

In addition to synchronizing content items across multiple devices, one or more embodiments of the online content management system 1702 can provide an efficient storage option for users that have large collections (e.g., galleries) of content items. For example, the online content management system 1702 can store a collection of content items, while the client device 1706 only stores reduced-sized versions of the content items. A user can navigate and browse the reduced-sized versions (e.g., thumbnail images of photos) of the content items on client device 1706. In particular, one way in which a user can experience content items is to browse the reduced-sized versions of the content items on client device 1706. Online content management system 1702 may store any number of reduced size versions (e.g., thumbnails) of digital content items and provide them to client device 1706 at a suitable time (e.g., to allow client device 1706 to emphasize one or more digital content items within a graphical user interface).

Client device 1706 may be a desktop computer, a laptop computer, a tablet computer, a personal digital assistant (PDA), an in- or out-of-car navigation system, a handheld device, a smart phone or other cellular or mobile phone, or a mobile gaming device, other mobile device, or other suitable computing devices. Client device 1706 may execute one or more client applications, such as a web browser (e.g., Microsoft Windows Internet Explorer, Mozilla Firefox, Apple Safari, Google Chrome, Opera, etc.) or a native or special-purpose client application (e.g., Application for iPhone or iPad or for Android, etc.), to access and view content over network 1704.

Network 1704 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which client devices 1706 may access online content management system 1702.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A non-transitory computer readable medium storing instructions thereon that, when executed by at least one processor, cause a computer device to:
   identify a plurality of content items based on each content item of the plurality of content items being associated with a first characteristic;
   filter the plurality of content items associated with the first characteristic to identify a first subset of content items from the plurality of content items based on determining the first subset of content items are associated with a second characteristic such that the first subset of content items are associated with both the first characteristic and the second characteristic;
   filter the plurality of content items associated with the first characteristic to identify a second subset of content items from the plurality of content items based on determining the second subset of content items are associated with a third characteristic, such that the second subset of content items are associated with both the first characteristic and the third characteristic; and
   provide, for display in a graphical user interface, an aggregate view for the plurality of content items, wherein the aggregate view comprises:
      a first portion of the graphical user interface comprising a grid comprising content items from the plurality of content items associated with the first characteristic; and
      a second portion of the graphical user interface comprising:
         a first collapsed view of the first subset of content items associated with the first characteristic and the second characteristic, the first collapsed view comprising a first representative content item from the first subset of content items that hides a first group of collapsed content items from the first subset of content items; and
         a second collapsed view of the second subset of content items associated with the first characteristic and the third characteristic, the second collapsed view comprising a second representative content item from the second subset of content items that hides a second group of collapsed content items from the second subset of content items.

2. The non-transitory computer readable medium of claim 1, further comprising instructions that, when executed by the at least one processor, cause the computer device to organize the content items from the plurality of content items in the grid based on timestamps associated with the content items.

3. The non-transitory computer readable medium of claim 1, further comprising instructions that, when executed by the at least one processor, cause the computer device to:
   determine the second characteristic by comparing color values content items associated with the first characteristic; and
   determine the third characteristic by identifying locations of the content items associated with the first characteristic.

4. The non-transitory computer readable medium of claim 1, further comprising instructions that, when executed by the at least one processor, cause the computer device to:
   identify the first representative content item from the first subset of content items; and
   associate metadata with the first representative content item, the metadata indicating it as the first representative content item.

5. The non-transitory computer readable medium of claim 1, further comprising instructions that, when executed by the at least one processor, cause the computer device to:
   identify an updated representative content item from the first subset of content items; and
   generate an updated collapsed view comprising a display of the updated representative content item.

6. The non-transitory computer readable medium of claim 1, further comprising instructions that, when executed by the at least one processor, cause the computer device to:
   receive an indication of a user selection of the first representative content item; and
   based on the indication of the user selection, provide an expanded view comprising the first group of collapsed content items.

7. A system comprising:
   at least one processor; and
   a non-transitory computer-readable medium storing instructions thereon that, when executed by the at least one processor, cause the system to:
   identify a plurality of content items associated with a first characteristic;
   filter the plurality of content items associated with the first characteristic to identify a first subset of content items from the plurality of content items based on determining the first subset of content items are associated with a second characteristic such that the first subset of content items are associated with both the first characteristic and the second characteristic;
   filter the plurality of content items associated with the first characteristic to identify a second subset of content items from the plurality of content items based on determining the second subset of content items are associated with a third characteristic, such that the second subset of content items are associated with both the first characteristic and the third characteristic; and
   provide, for display in a single graphical user interface, an aggregate view comprising:
      a first portion of the single graphical user interface comprising a grid comprising content items from the plurality of content items associated with the first characteristic; and
      a second portion of the single graphical user interface comprising:
         a first collapsed view of the first subset of content items associated with the first characteristic and the second characteristic, the first collapsed view comprising a first representative content item from the first subset of content items that represents a first group of collapsed content items from the first subset of content items that are not displayed; and
         a second collapsed view of the second subset of content items associated with the first characteristic and the third characteristic, the second collapsed view comprising a second representative content item from the second subset of content items that represents a second group of collapsed content items from the second subset of content items.

8. The system of claim 7, further comprising instructions that, when executed by the at least one processor, cause the system to:
   receive an indication of a user selection of the first representative content item; and
   based on the indication of the user selection, display the first group of collapsed content items from the first subset of content items.

9. The system of claim 7, further comprising instructions that, when executed by the at least one processor, cause the system to provide a visual indicator corresponding to the first representative content item to indicate that the first representative content item represents the first subset of content items that is collapsed.

10. The system of claim 9, further comprising instructions that, when executed by the at least one processor, cause the system to:
    display the first group of collapsed content items from the first subset of content items based on detecting an indication of a user selection of the first representative content item; and
    provide the visual indicator for display in combination with the first group of collapsed content items.

11. The system of claim 7, further comprising instructions that, when executed by the at least one processor, cause the system to:
    determine the first characteristic from name data associated with the plurality of content items;
    determine the second characteristic from timestamp data associated with the plurality of content items of the first characteristic; and
    determine the third characteristic from location data associated with the plurality of content items of the first characteristic.

12. The system of claim 7, further comprising instructions that, when executed by the at least one processor, cause the system to provide, for display, content item details in response to an indication of a user selection of a content item from the grid.

13. The system of claim 7, further comprising instructions that, when executed by the at least one processor, cause the system to provide, for display, a list of content item actions in response to an indication of a user selection of a content item from the grid.

14. A computer-implemented method comprising:
    identifying a plurality of content items based on each content item of the plurality of content items being associated with a first characteristic;
    filtering the plurality of content items associated with the first characteristic to identify a first subset of content items from the plurality of content items based on determining the first subset of content items are associated with a second characteristic such that the first subset of content items are associated with both the first characteristic and the second characteristic;
    filtering the plurality of content items associated with the first characteristic to identify a second subset of content items from the plurality of content items based on determining the second subset of content items are associated with a third characteristic, such that the second subset of content items are associated with both the first characteristic and the third characteristic; and
    providing, for display in a graphical user interface, an aggregate view comprising:
       a first portion of the graphical user interface comprising a grid comprising content items from the plurality of content items associated with the first characteristic; and
       a second portion of the graphical user interface comprising:
          a first collapsed view of the first subset of content items associated with the first characteristic and the second characteristic, the first collapsed view comprising a first representative content item from the first subset of content items that hides a first group of collapsed content items from the first subset of content items; and
          a second collapsed view of the second subset of content items associated with the first characteristic and the third characteristic, the second collapsed view comprising a second representative content item from the second subset of content items that hides a second group of collapsed content items from the second subset of content items.

15. The computer-implemented method of claim 14, further comprising organizing the content items in the grid based on timestamps associated with the content items.

16. The computer-implemented method of claim 14, further comprising identifying the first subset of content items from the plurality of content items based on timestamp metadata associated with each content item from the plurality of content items.

17. The computer-implemented method of claim 14, further comprising identifying the second subset of content items from the plurality of content items based on geographic location metadata associated with each content item from the plurality of content items.

18. The computer-implemented method of claim 14, further comprising:
    identifying an updated representative content item from the first subset of content items; and
    generating an updated collapsed view comprising a display of the updated representative content item.

19. The computer-implemented method of claim 14, further comprising providing, within the first collapsed view of the first subset of content items, a visual indication that the first subset of content items is collapsed.

20. The computer-implemented method of claim 14, wherein providing the first collapsed view of the first subset of content items comprises varying a size of the first representative content item with respect to a size of the content items in the grid.

* * * * *